US006972874B2

(12) United States Patent
Izumi et al.

(10) Patent No.: US 6,972,874 B2
(45) Date of Patent: Dec. 6, 2005

(54) IMAGE COMMUNICATING APPARATUS

(75) Inventors: Michihiro Izumi, Chiba (JP); Akihiro Yoshitani, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 883 days.

(21) Appl. No.: 09/891,583

(22) Filed: Jun. 27, 2001

(65) Prior Publication Data
US 2002/0051223 A1 May 2, 2002

(30) Foreign Application Priority Data
Jul. 6, 2000 (JP) .............................. 2000-205407

(51) Int. Cl.[7] .............................................. H04N 1/00
(52) U.S. Cl. ...................... 358/402; 358/403; 358/405; 358/440; 358/448; 358/451; 358/474
(58) Field of Search ............................... 358/402, 403, 358/405, 440, 448, 451, 474

(56) References Cited

U.S. PATENT DOCUMENTS

| 5,684,865 | A | * | 11/1997 | Mohtashemi et al. | 379/100.17 |
| 5,861,887 | A |   | 1/1999  | Butler et al. | 345/428 |
| 6,061,502 | A | * | 5/2000  | Ho et al. | 358/1.15 |
| 6,101,526 | A | * | 8/2000  | Mochizuki | 709/200 |
| 6,101,548 | A | * | 8/2000  | Okada | 709/236 |
| 6,181,818 | B1 |  | 1/2001  | Sato et al. | 382/170 |
| 6,246,804 | B1 |  | 6/2001  | Sato et al. | 382/284 |
| 6,335,966 | B1 | * | 1/2002  | Toyoda | 379/100.06 |
| 6,388,771 | B1 | * | 5/2002  | Tamaki | 358/442 |
| 6,426,809 | B1 | * | 7/2002  | Hayashi et al. | 358/529 |

FOREIGN PATENT DOCUMENTS

| EP | 0 586 074 A2 | 3/1994  | .......... G06F 15/64 |
| EP | 0812100 A2   | 12/1997 | .......... H04N 1/00  |
| EP | 0 952 724 A2 | 10/1999 | .......... H04N 1/00  |
| FR | 2 702 580    | 9/1994  | .......... G06F 15/62 |
| GB | 2 259 824 A  | 3/1993  | .......... H04N 7/13  |
| JP | 9325924      | 12/1997 | .......... G06F 13/00 |
| JP | 10322501     | 12/1998 | .......... H04N 1/00  |
| JP | 11068825     | 3/1999  | .......... H04L 12/54 |

* cited by examiner

Primary Examiner—Kimberly Williams
Assistant Examiner—Michael Burleson
(74) Attorney, Agent, or Firm—Fitzpatrick, Cella, Harper & Scinto

(57) ABSTRACT

An image communicating apparatus determines whether or not the amount of compressed image data is a predetermined amount or greater when transmitting a scanned color image as attached data in an e-mail message. If the amount of data is the predetermined amount or greater, the compressed image data is decompressed, and the image data is again compressed with a lower resolution, thereby reducing the amount of data to less than the predetermined amount. The image data is then attached to an e-mail message, and the e-mail message is transmitted.

24 Claims, 13 Drawing Sheets

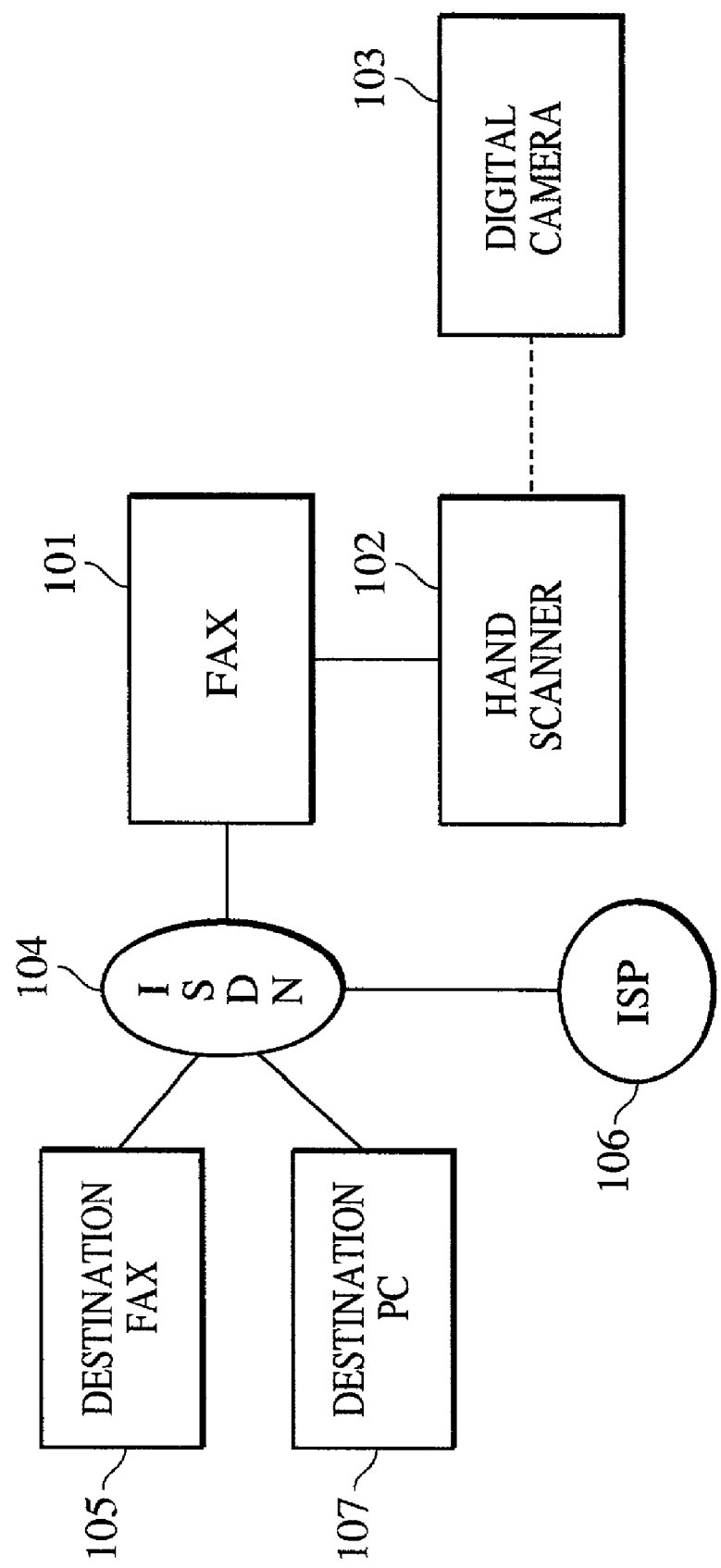

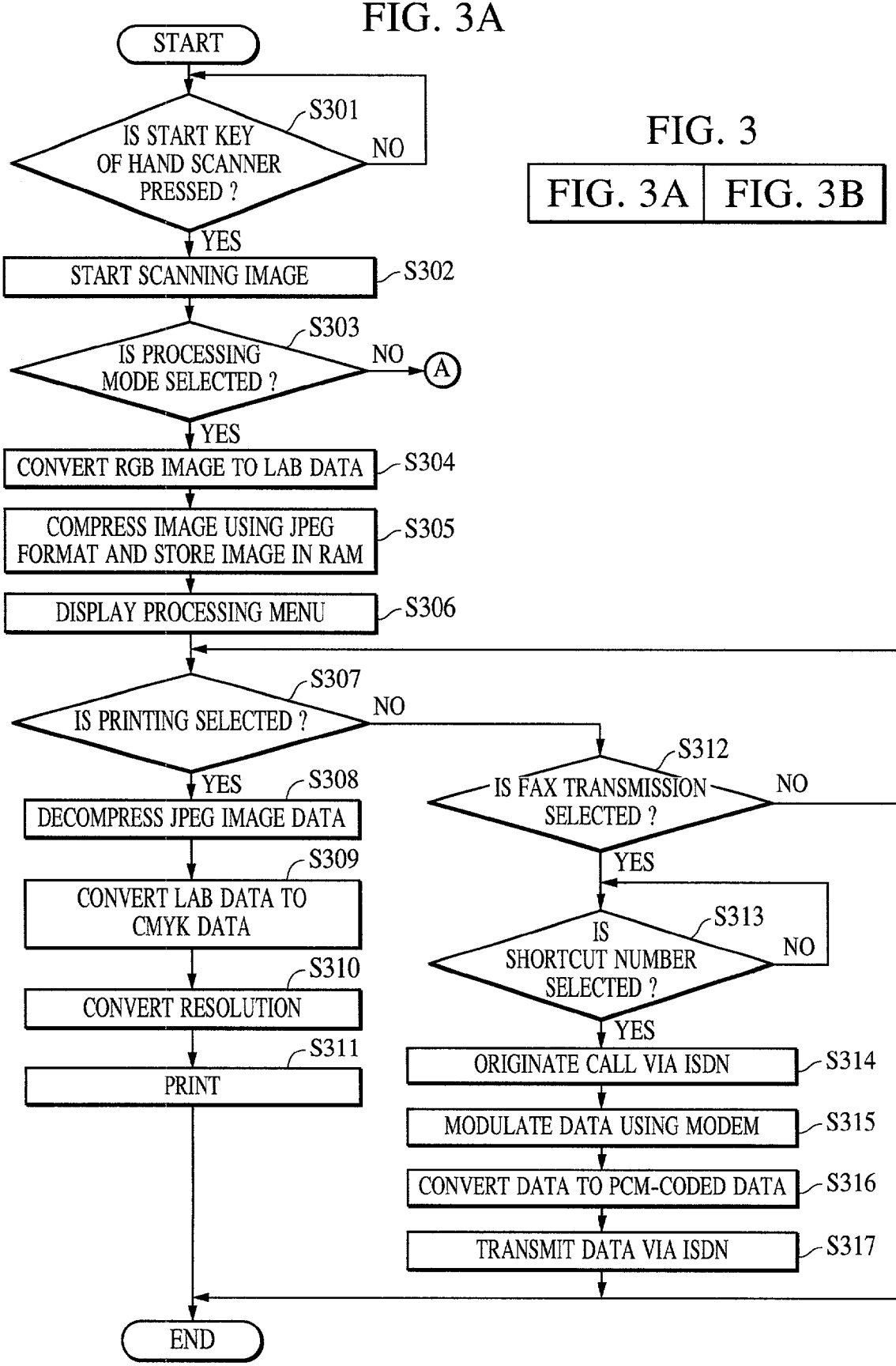

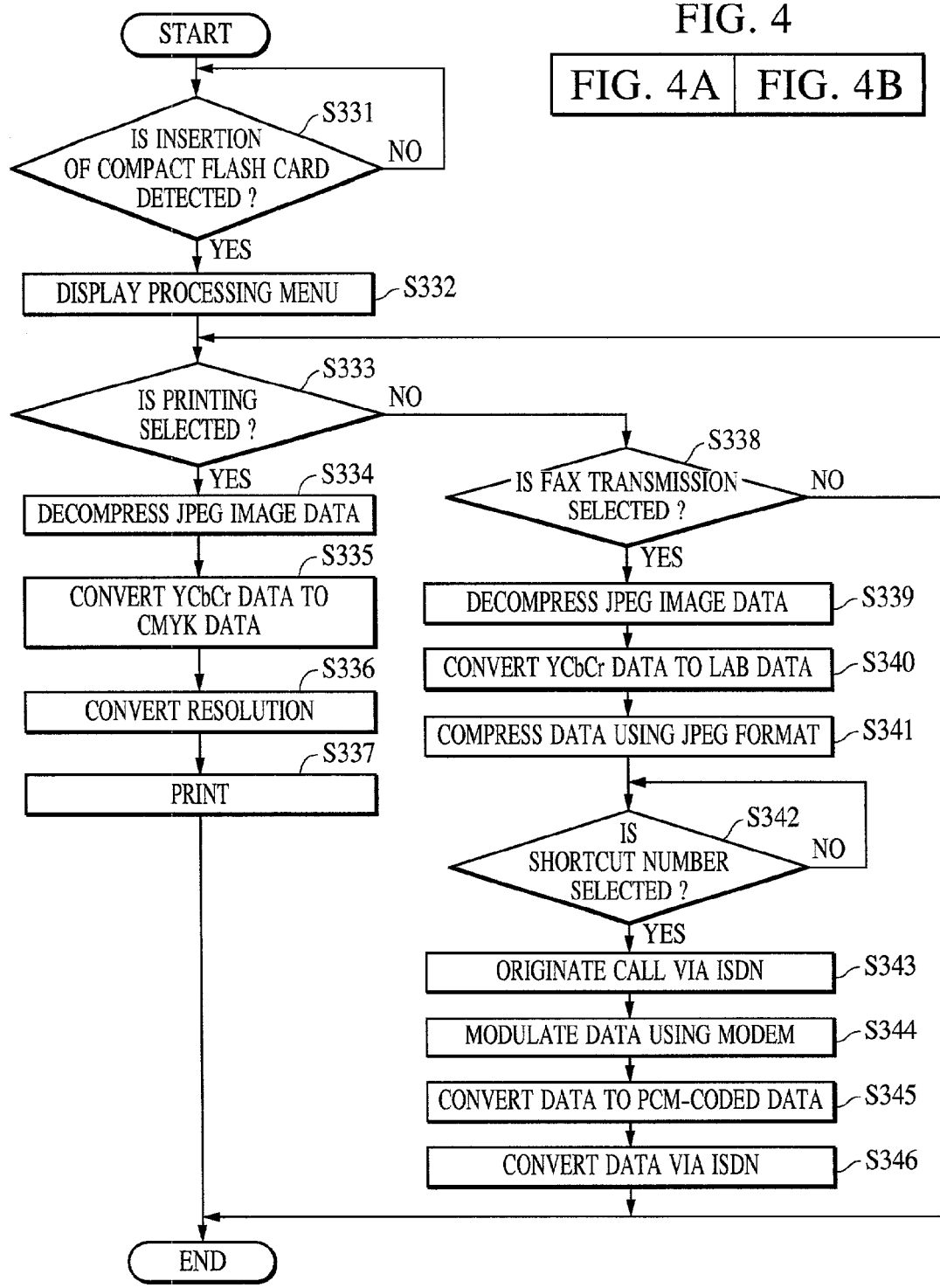

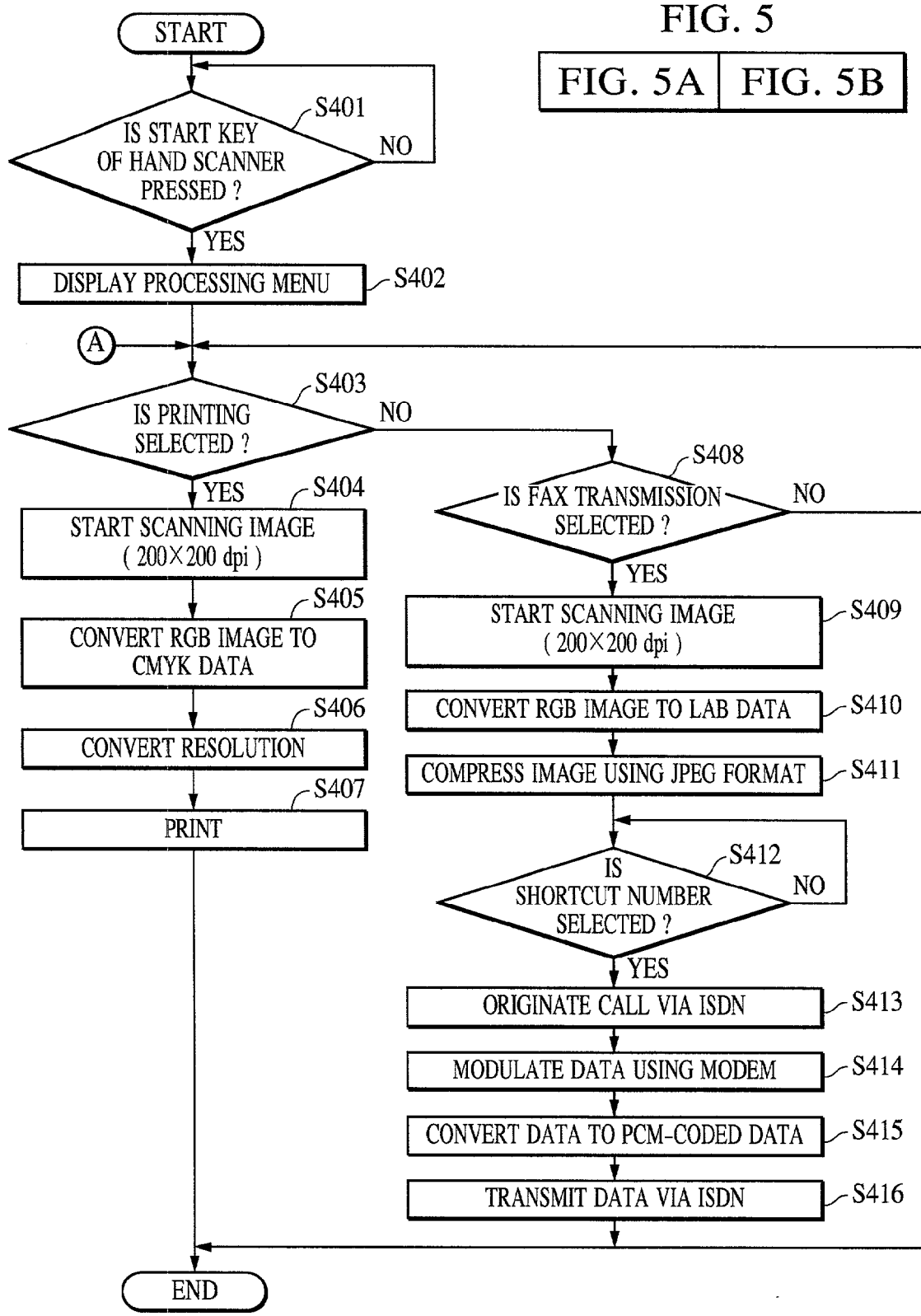

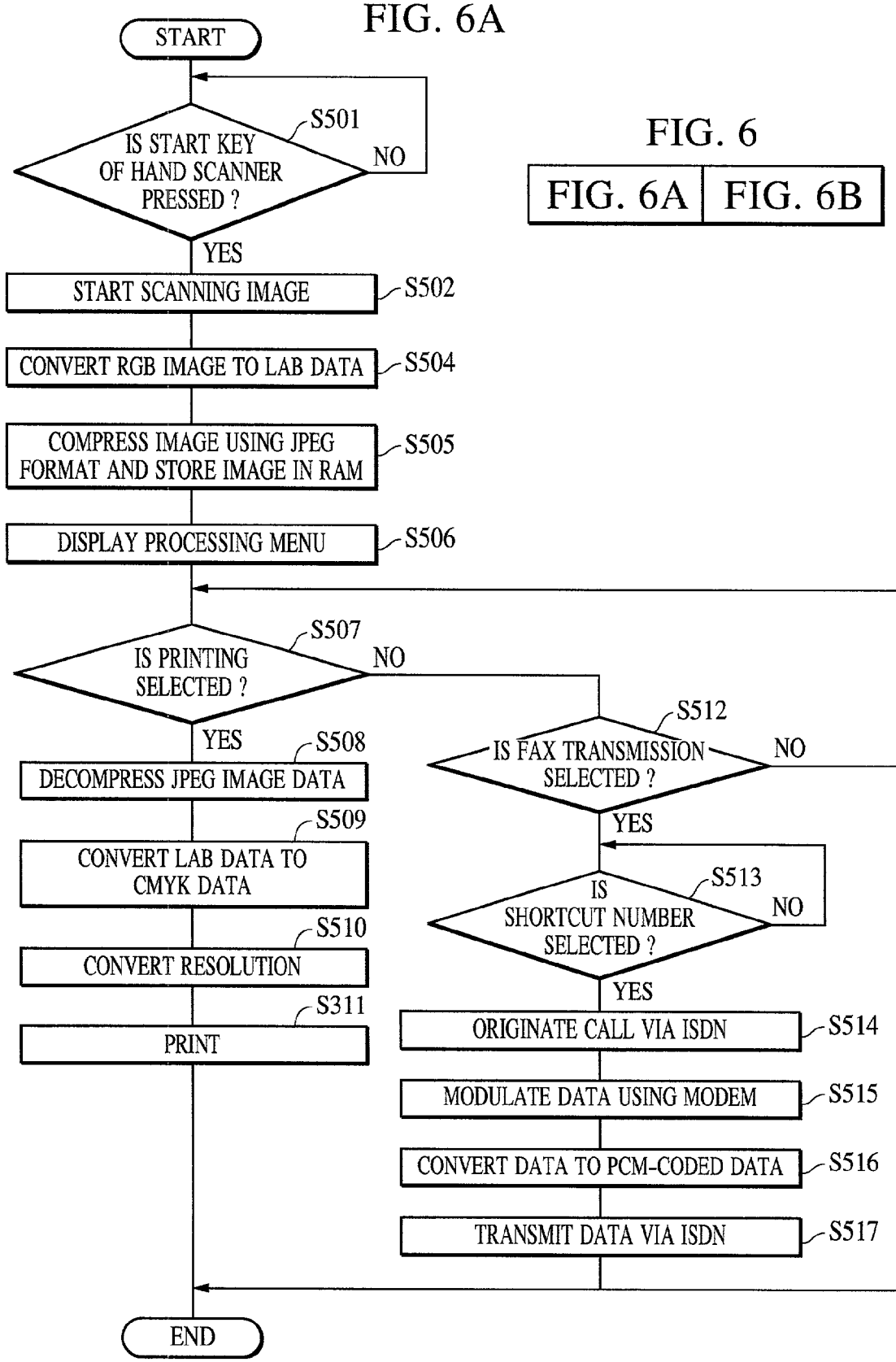

IMAGE COMMUNICATING APPARATUS

BACKGROUND OF THE INVENTION

1. Field of the Invention

The present invention relates to a technology for controlling transmission of an image as an attached file in facsimile communication.

2. Description of the Related Art

As the Internet has become widely used in recent years, there has been an increasing demand to attach images to e-mail messages to be transmitted from facsimile apparatuses.

For example, in Japanese Patent Laid-Open No. 9-325924, an apparatus for converting image data read by a facsimile apparatus to TIFF (tagged image file format) data and transmitting the data as an email message has been proposed.

A conventional e-mail transmission method using a facsimile apparatus will now be described.

A user places a document to be transmitted on a document holder of a facsimile apparatus and inputs a password for specifying a user name. The user selects a transmission destination from among those listed in a destination table, inputs a shortcut number, and presses a start key or a one-touch key.

In response to this, the facsimile apparatus reads the document page by page, and an encoder of the facsimile apparatus encodes images on all pages to MMR (modified modified READ) format. The encoded data are stored as image data in an image memory in accordance with the Group 3 (G3) format. The facsimile apparatus reads information about the destination, which is designated by the shortcut number or one-touch dialing, from the destination table and performs processing required for transmitting the image data as an e-mail message.

When transmitting image data as an e-mail message, image data in the G3 format is converted to TIFF format, and the converted data is transmitted. When converting data to TIFF format, header information indicating "TIFF ClassF" is appended at the head of the G3 format image data, thereby creating image data in the TIFF format. Since TIFF image data is binary data, the data in the TIFF format is then converted to text data.

When data that can be transmitted as an e-mail message is created, a connection is established by dialing up an internet service provider (ISP). When a phone line to the ISP is established, the facsimile apparatus logs in in accordance with the password authentication protocol (PAP) procedures and transmits the e-mail message in accordance with the simple mail transfer protocol (SMTP). After the e-mail message is transmitted, the facsimile apparatus logs off, and the phone line is released.

In the conventional example described above, only monochrome images are taken into consideration as image data to be transmitted by the facsimile apparatus.

In the case of monochrome images, for example, a document of A4 size, which is a standard size, is scanned and MMR-coded. As a result, the amount of data is approximately 20 KB, or 100 KB at most. When image data is not compressed at all, the amount of data is approximately 500 KB. This being the case, when image data on a page is transmitted as attached data in an e-mail message, no particular problems arise.

Recently, however, more and more facsimile apparatuses capable of scanning color images have been used. Accordingly, it is necessary to transmit a color image as attached data in an e-mail message.

In the case of color images, the amount of data is much greater than that of monochrome images. The amount of data of an A4-sized color document of 200×200 dpi is approximately 11.3 MB. Even when color image data is compressed according to the JPEG format, the amount of data may still exceed 1 MB.

In general, when data exceeding 1 MB is sent as attached data in an e-mail message, the burden on a server is very heavy, and hence a system failure may be caused.

When transmitting monochrome images by attaching them to an e-mail message, and if image data on a plurality of pages are collectively attached to the e-mail message, as in normal facsimile transmission, the total amount of data may exceed 1 MB, and a problem similar to that in color image transmission arises.

In order to solve the foregoing problems, Japanese Patent Laid-Open No. 10-322501 and Japanese Patent Laid-Open No. 11-068825 propose apparatuses for transmitting image data on a page by dividing the image data into a plurality of e-mail messages. These apparatuses take into consideration only monochrome images. When a JPEG-compressed image is divided and transmitted, a receiver has difficulty in reconstructing the data. In such a case, these apparatuses cannot be used.

SUMMARY OF THE INVENTION

Accordingly, it is an object of the present invention to provide an image communicating apparatus and a control method therefor which solve the foregoing problems.

Another object of the present invention is to provide an image communicating apparatus and method for controlling the amount of attached data to be a predetermined amount or smaller when transmitting an image as attached data in an e-mail message.

It is a further object of the present invention is to provide an image communicating apparatus and a control method therefor for lessening the burden on a server when transmitting an image as attached data in an e-mail message.

Yet another object of the present invention is to provide an image communicating apparatus and a control method therefor for controlling the image communicating apparatus not to transmit a large image as an attached file in facsimile communication.

Further objects, features, and advantages of the present invention will become apparent from the following description of the preferred embodiments with reference to the attached drawings.

BRIEF DESCRIPTION OF THE DRAWINGS

FIG. 1 is a block diagram of the configuration of a communication system according to a first embodiment of the present invention;

FIGS. 3A and 3B when taken together as shown in FIG. 3 form a flowchart showing a process performed by the fax in the first embodiment;

FIGS. 4A and 4B when taken together as shown in FIG. 4 form a flowchart showing a process performed by the fax in the first embodiment;

FIGS. 5A and 5B when taken together as shown in FIG. 5 form a flowchart showing a process performed by the fax according to a second embodiment of the present invention;

FIGS. 6A and 6B when taken together as shown in FIG. 6 form a flowchart showing a process performed by the fax according to a fifth embodiment of the present invention.

DESCRIPTION OF THE PREFERRED EMBODIMENTS

First Embodiment

FIG. 1 shows the configuration of a communication system according to a first embodiment of the present invention.

Referring to FIG. 1, a facsimile apparatus (hereinafter referred to as a "fax") 101 of the first embodiment is shown. The communication system includes a hand scanner 102 connected to the fax 101, a digital camera 103, an integrated services digital network (ISDN) 104, a destination facsimile apparatus (hereinafter referred to as a "destination fax") 105, an internet service provider (hereinafter referred to as an "ISP") 106, and a destination computer (hereinafter referred to as a "destination PC") 107.

In the first embodiment, the hand scanner 102 and the digital camera 103 exchange image data using a memory card, such as a CompactFlash(™) card or the like. Alternatively, the digital camera 103 can be connected to the fax 101 or to the hand scanner 102 by cable, and hence data can be exchanged. Also, data can be exchanged by wireless communication.

[Device Configuration]

Figure 2A:
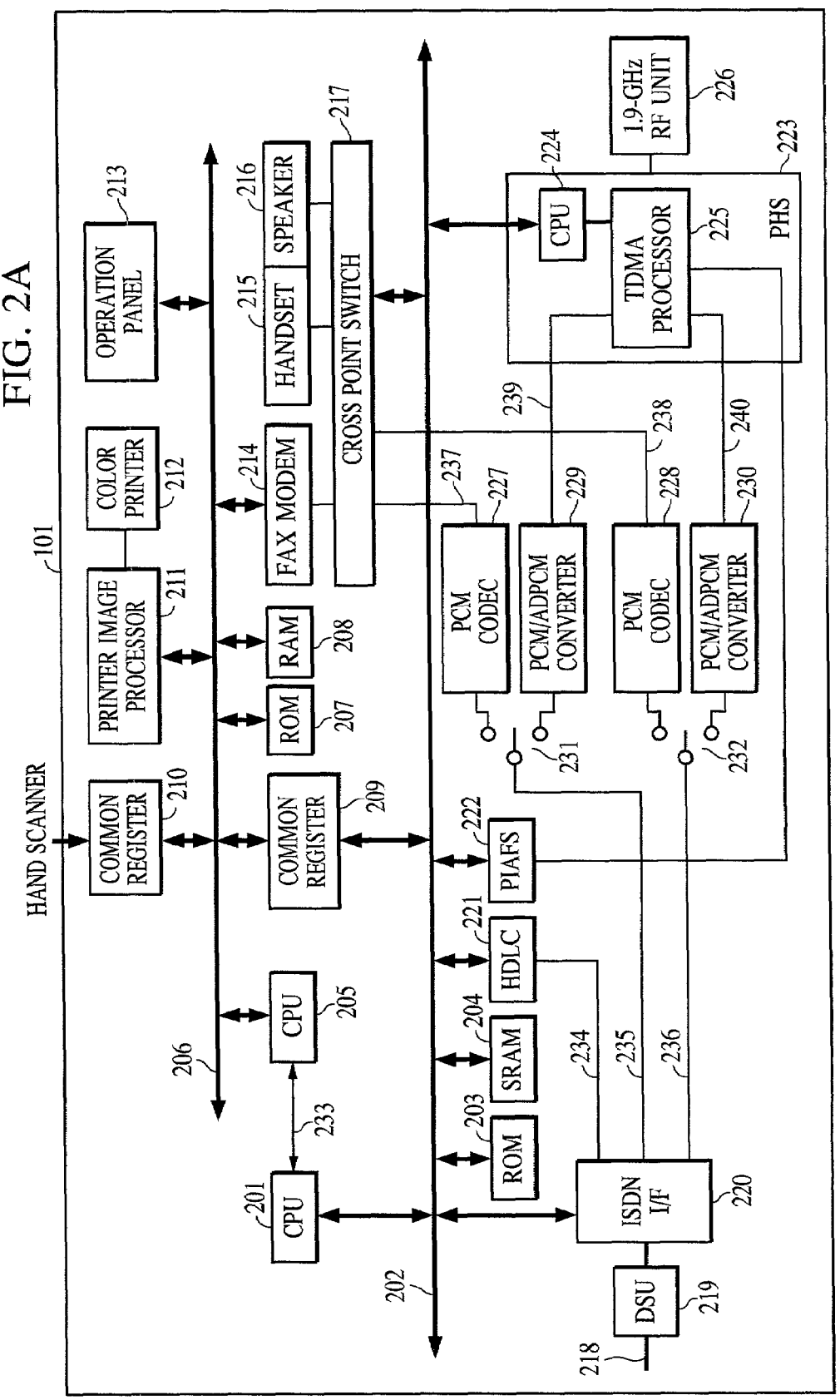
FIG. 2A is a block diagram of a facsimile apparatus (hereinafter referred to as a "fax") in the first embodiment.
Figure 2B:
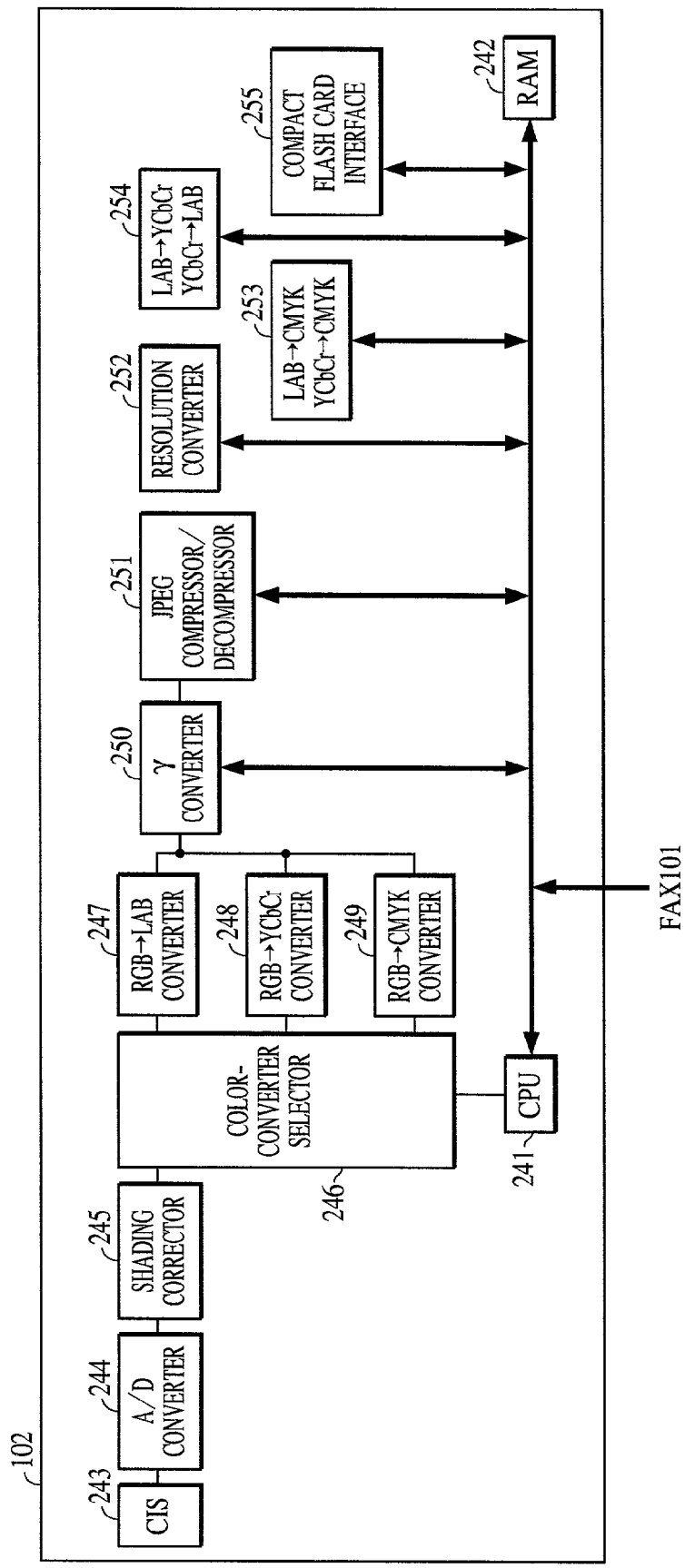
FIG. 2B is a block diagram of a hand scanner in the first embodiment.

FIG. 2A shows the structure of the fax 101, and FIG. 2B shows the structure of the hand scanner 102. The fax 101 and the hand scanner 102 are connected to each other.

Referring to FIG. 2A, the fax 101 includes a first central processing unit (CPU) 201, a data bus/address bus 202, a read only memory (ROM) 203, and a static random access memory (SRAM) 204.

A second CPU 205 uses middleware to compress and decompress image data according to the JPEG format. The fax 101 further includes a data bus 206 for the CPU 205, a ROM 207, and a random access memory (RAM) 208.

A common register 209 is used to exchange data between the system at the CPU 201 side and the system at the CPU 205 side. A common register 210 is used to exchange data between the CPU 205 and the hand scanner 102.

The fax 101 further includes a printer image processor 211 and a color printer 212 for printing images. The printer image processor 211 converts image data to 360 dpi, which is equal to the resolution of the color printer 212, and transmits the converted data as printing data to the color printer 212.

The fax 101 further includes an operation panel 213, a fax modem 214, a handset 215, and a speaker 216. These devices are controlled by the CPU 205 and are connected to a cross point switch 217. Audio or facsimile analog data is connected to a public communication network via the cross point switch 217.

The fax 101 further includes an ISDN line (U point) 218. A digital service unit (DSU) 219 converts data exchanged with a local switchboard to a transistor-transistor logic (TTL) level signal. An ISDN interface 220 controls first to third layers of the ISDN. The ISDN interface 220 inputs data to and outputs data from the B channel of the ISDN.

A high-level data link control (HDLC) controller 221 assembles and disassembles data in HDLC format with respect to the ISDN.

A wireless data communication protocol processor 222, that is, a personal handy phone (PHS) internet access forum standard (PIAFS) controller, assembles and disassembles frames in wireless data communication protocol format.

A PHS processor 223 uses a CPU 224 to process data using a PHS wireless communication protocol. When performing time-division multiplexing of four slots in order to transmit and receive data, a time division multiple access (TDMA) processor 225 assembles and disassembles frames. A 1.9-GHz radio frequency (RF) unit 226 transmits and receives 1.9-GHz radio waves. Since the PHS processor 223 is provided in the fax 101, a digital cordless telephone can be used as an extension in the first embodiment.

Pulse code modulation (PCM) codecs 227 and 228 convert analog signals to PCM-coded data and vice versa. PCM/adaptive differential pulse code modulation (ADPCM) converters 229 and 230 convert ADPCM-coded data transmitted over a PHS wireless link to PCM-coded data.

Under the control of the CPU 201, bus switches 231 and 232 select analog signals, such as fax data, or audio signals output from the PHS processor 223, which are sent from the digital cordless telephone, as data to be transmitted over the ISDN.

Major signal lines shown in FIG. 2A will now be described.

A serial communication signal line 233 is for exchanging control signals between the CPU 201 and the CPU 205.

Serial signal lines 234, 235, and 236 are used for inputting data to and outputting data from the ISDN interface 220. The ISDN interface 220 selects two from among the serial signal lines 234, 235, and 236, and connects them to the B1 channel and B2 channel of the ISDN.

Analog signal lines 237 and 238 are used for inputting data to and outputting data from the fax modem 214 and the handset 215. Signal lines 239 and 240 are for ADPCM-coded audio signals which are input to and output from the digital cordless telephone.

With reference to FIG. 2B, the structure of the hand scanner 102 is described.

Referring to FIG. 2B, the hand scanner 102 includes therein a CPU 241 and a RAM 242. A contact image sensor (CIS) 243 scans images. The CIS 243 includes built-in red (R), green (G), and blue (B) light emitting diode (LED) arrays. When a timing signal (not shown) is input to the CIS 243, an RGB video signal is output in synchronization with the timing signal.

An analog-to-digital (A/D) converter 244 converts video signals output from the CIS 243 to digital signals. The hand scanner 102 further includes a shading corrector 245 and a color-converter selector 246. Under the control of the CPU 241, the color-converter selector 246 selects one from among the following converters in accordance with a user instruction given from the operation panel 213 of the fax 101.

An RGB→CIELAB color-space converter 247 is used when performing facsimile communication. An RGB→YCbCr color-space converter 248 is used when attaching a color image to an e-mail message destined to a computer. An RGB→CMYK color-space converter 249 is used when performing color printing by the color printer 212.

The hand scanner 102 further includes a γ converter 250 for converting luminance to density, a JPEG compressor/decompressor 251, and a resolution converter 252 which is a feature of the first embodiment of the present invention.

A CIELAB→CMYK/YCbCr→CMYK converter 253 converts CIELAB or YCbCr color-space data to CMYK data for printing.

A CIELAB-YCbCr converter 254 converts CIELAB color-space data to YCbCr color-space data and vice versa.

A memory card interface 255 is used to obtain image data captured by the digital camera 103 for a memory card such as a CompactFlash card or the like. For example, a CompactFlash card interface is used as the memory card interface 255.

Alternatively, RGB→CIELAB color-space conversion, RGB→YCbCr color-space conversion, γ conversion, JPEG compression, CMYK conversion, and the like can be performed by middleware of the CPU 241.

[Transmission of Scanned Data]

Figure 3B:
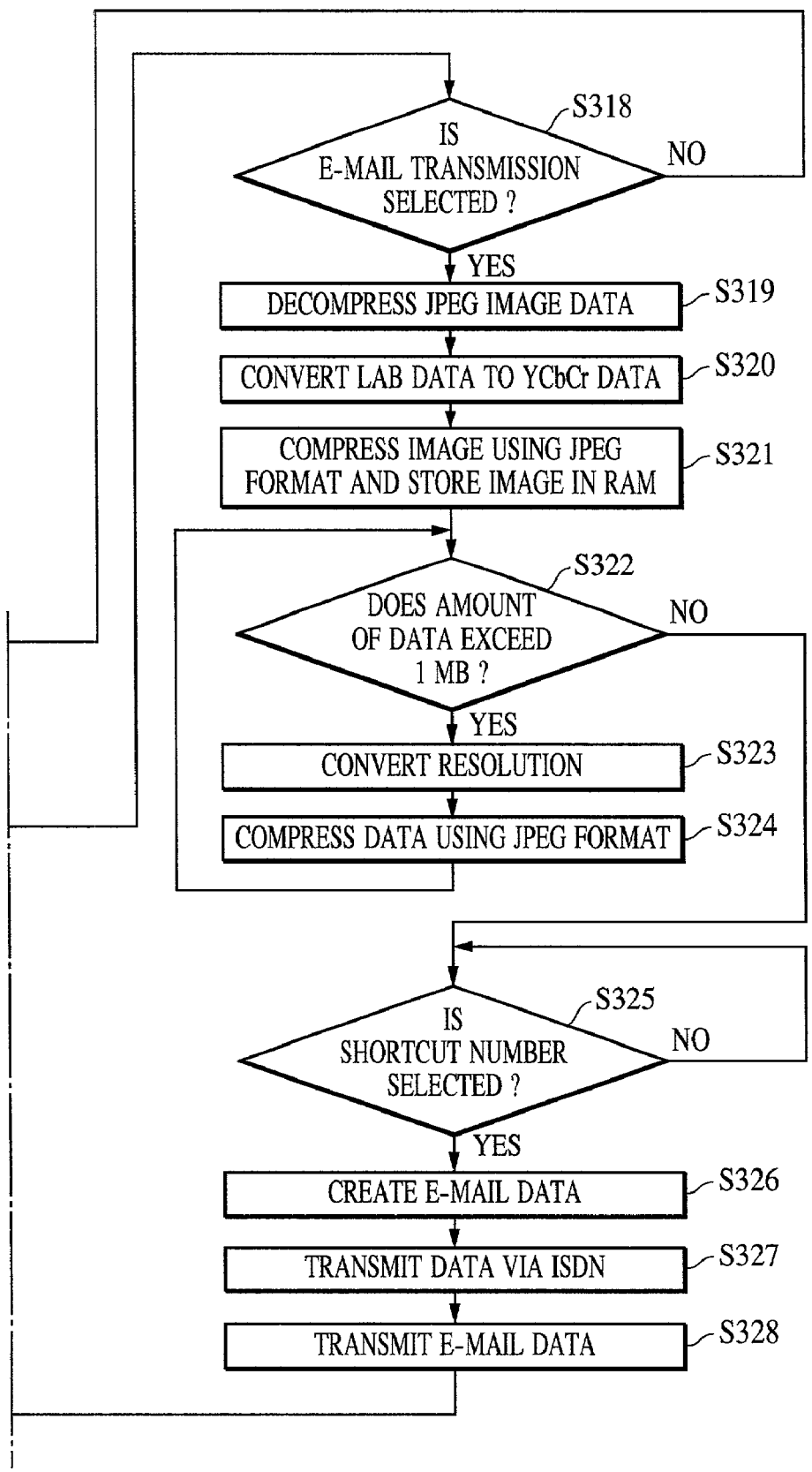

FIG. 3, which consists of FIGS. 3A and 3B, is a flowchart showing a process for transmitting image data scanned by the hand scanner 102 connected to the fax 101 of the first embodiment.

The hand scanner 102 is removed from the fax 101, and a start key of the hand scanner 102 is pressed (step S301). The process starts scanning an image with a resolution of 200×200 dpi (step S302). When the hand scanner 102 starts scanning, the CIS 243 outputs RGB video signals. The output video signals are converted to digital signals and are subjected to shading correction.

The process determines whether or not a processing mode of the fax 101 is selected (step S303).

In the first embodiment, the processing mode of the fax 101 can be selected by a user by using the operation panel 213. Selectable processing modes include a printing mode for printing image data, a fax transmission mode for transmitting image data to another fax, and an e-mail transmission mode for transmitting image data as attached data in an e-mail message to be sent to a computer.

In the first embodiment, it is assumed that the user sets the processing mode after the hand scanner 102 finishes scanning the image. After the determination is made in step S303, the process branches to step S304. If it is determined in step S303 that the processing mode is selected, the process branches to step S403 shown in FIG. 5, which will be described hereinafter in a second embodiment of the present invention.

In step S304, the process determines that the CPU 241 selects the fax transmission mode as the default. The color-converter selector 246 changes the selection state and inputs the shading-corrected data to the RGB→CIELAB color-space converter 247.

The LAB-converted data is subjected to color correction by the γ converter 250, and this data is JPEG-compressed by the JPEG compressor/decompressor 251. Subsequently, the compressed data is stored in the RAM 242 (step S305).

If the original image is an A4-sized color document, the amount of image data prior to performing the JPEG compression can be computed as follows.

(210/25.4) mm×200 dpi×(290/25.4) mm×200 dpi×3($L$, $A$, $B$) ×8 bit=90.6 Mbit=11.3 MB The above amount of data is compressed to approximately 1/10 to 1/20 according to the JPEG format. As a result, the amount of compressed data is approximately a few hundreds kilobytes.

When the scanning is completed, and when the process detects that the hand scanner 102 is attached to the fax 101, the CPU 205 controls a display unit of the operation panel 213 to display a menu so that the user can select printing, fax transmission, or e-mail transmission.

When "printing" is selected (step S307), the JPEG image data stored in the RAM 242 of the hand scanner 102 is decompressed by the JPEG compressor/decompressor 251 (step S308). The decompressed data is converted to CMYK color-space printing data by the CIELAB→CMYK/YCbCr→CMYK converter 253, and the converted data is again stored in the RAM 242 (step S309). The data stored in the RAM 242 is transferred to the printer image processor 211 in the fax 101 via the common register 210. The printer image processor 211 converts the image data to printing data at 360 dpi, which is equal to the resolution of the color printer 212 (step S310). The converted data is transferred to the color printer 212 and is printed (step S311).

If "fax transmission" is selected (step S312), the process waits for a shortcut number of the destination fax 105 to be selected (step S313), and then the process originates a call via the ISDN to the selected phone number (step S314). If a response is made by the ISDN, the JPEG image data stored in the RAM 242 in the hand scanner 102 is transferred to the fax modem 214 via the common register 210, and the data is subjected to analog modulation (step S315). The analog signal is converted to PCM-coded data by the PCM codec 227 (step S316) and is transmitted to the ISDN (step S317). If the destination fax 105 has a function for decompressing JPEG data, the destination fax 105 decompresses the received file and prints the data.

If "e-mail transmission" is selected (step S318), it is necessary to convert the stored LAB color-space image data to YCbCr color-space data. The JPEG image data stored in the RAM 242 is decompressed by the JPEG compressor/decompressor 251 (step S219), and the decompressed data is converted to YCbCr color-space data by the CIELAB-YCbCr converter 254 (step S320). Subsequently, the data is again JPEG-compressed by the JPEG compressor/decompressor 251, and the data is stored in the RAM 242 (step S321).

If the amount of data stored in the RAM 242 is below 1 MB (step S322), the process determines that there is no problem in attaching the data to an e-mail message and sending the e-mail message. The process directly proceeds to transmission processing (step S325).

In contrast, if the amount of data stored in the RAM 242 is 1 MB or greater (step S322), it is necessary to convert the resolution in order to reduce the amount of data.

The uncompressed 200×200 dpi data is converted to 100×100 dpi by decimation (step S323). Subsequently, the data is again compressed according to the JPEG format (step S324). As a result, the amount of data is reduced to substantially one fourth. Often, the amount of JPEG-compressed data is smaller than 1 MB. If the amount of data is still 1 MB or greater (step S322), the process again performs processing in order to reduce the resolution (step S323). When the amount of JPEG-compressed data is smaller than 1 MB, image data to be transmitted is set.

When the image data to be transmitted is set, the process starts transmission processing. The process waits for a shortcut number that corresponds to the recipient e-mail address to be selected (step S325). In order to create data to be attached to an e-mail message, the image data stored in the RAM 242 in the hand scanner 102 is transferred to the SRAM 204 in the fax 101 via the common register 210.

Since, on the Internet, it is necessary to append predetermined header information to an e-mail message, the process appends information, such as "From:" which indicates the sender, "To:" which indicates the recipient, "Subject:" which indicates the title, "Cc:" which indicates the recipient of a copy of the e-mail message, and "Date:" which indicates the date, to the head of the JPEG-compressed image data to be transmitted. In order to notify the recipient that the JPEG-compressed image data is attached, the file name "XXXXXXX.JPG" is appended to the header information. By appending the header information to the JPEG-compressed image data stored in the SRAM 204, data in the e-mail format is created (step S326).

When the e-mail format data is created, the process originates a call to the pre-registered ISP 106 (step S327). When a response message from the ISDN is received, the process establishes a connection with a communication path. When a phone line with the ISP 106 is established, the process logs in through the PAP procedures and sends the e-mail message in accordance with SMTP (step S328).

The e-mail format data in the SRAM 204 is transferred to the HDLC controller 221 and is assembled into an HDLC frame. The HDLC frame is transmitted to the ISP 106 via the ISDN interface 220.

The destination PC 107, which is the recipient of the e-mail message, receives the e-mail message which has been transmitted to the ISP 106 via the Internet. The destination PC 107 can open the e-mail message to which the JPEG-compressed image data is attached. If the destination PC 107 has a function for decompressing JPEG data, the destination PC 107 can read the transmitted color image.

In the first embodiment, an example has been described in which the process determines whether or not the amount of compressed image data is 1 MB or greater when the "e-mail transmission" mode is selected, and the resolution is converted in accordance with the determination result. However, the present invention is not limited to this example. For example, when the "e-mail transmission" mode is selected, the resolution can always be converted regardless of the amount of data. Accordingly, JPEG compression processing is simplified, and hence the processing speed increases. In this case, immediately after decompressing the JPEG data in step S319, the process converts the resolution in step S323 and compresses the data according to the JPEG format in step S324.

Instead of converting the resolution, the data compression ratio can be increased by changing a quantization table used to perform JPEG compression, thereby reducing the amount of data. In other words, the larger the value in the quantization table, the greater the data compression ratio becomes. A combination of resolution conversion and changing of values in the quantization table can be used in order to reduce the amount of data.

[Transmission of Other Data]

Figure 4B:
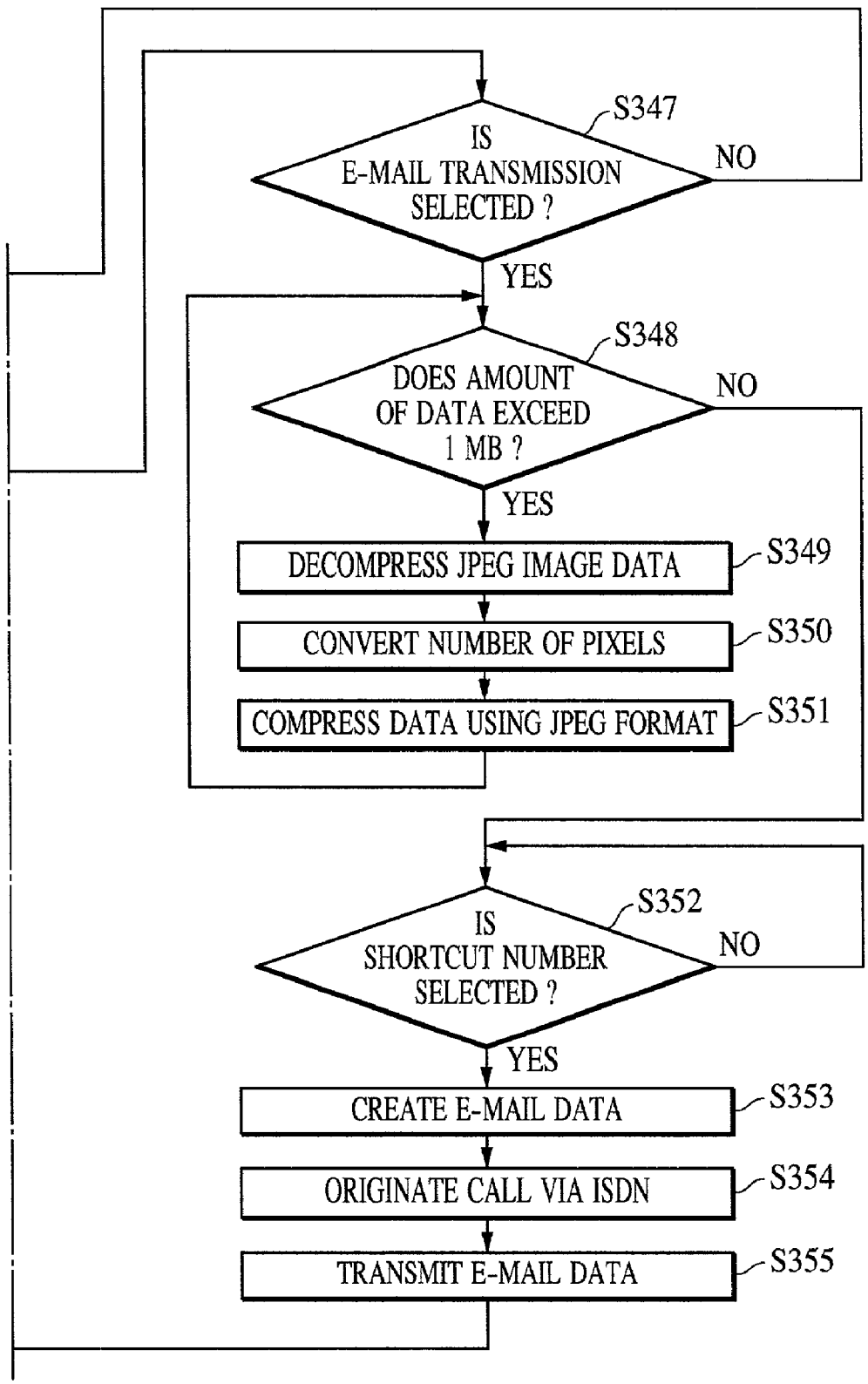

FIG. 4, which consists of FIGS. 4A and 4B, is a flowchart showing a process for transmitting, by the fax 101 of the first embodiment, image data obtained by another image input device (the digital camera 103 in the first embodiment).

In the digital camera 103, captured RGB image data is converted to YCbCr color-space data. This data is compressed according to the JPEG format and is stored in a CompactFlash card.

The hand scanner 102 connected to the fax 101 can obtain data stored in the CompactFlash card through the memory card interface 255. When the CPU 241 detects that the CompactFlash card is inserted into the hand scanner 102 (step S331), the process notifies the CPU 205 in the fax 101 that the CompactFlash card is inserted. Accordingly, the process causes the display unit of the operation panel 213 in the fax 101 to display a menu so that the user can select printing, fax transmission, or e-mail transmission (step S332).

If "printing" is selected (step S333), the JPEG image data read from the CompactFlash card is decompressed by the JPEG compressor/decompressor 251 (step S334). The CIELAB→CMYK/YCbCr→CMYK converter 253 creates printing data (step S335), and subsequently the data is stored in the RAM 242. The data stored in the RAM 242 is transferred to the printer image processor 211 in the fax 101. The printer image processor 211 converts the image data to printing data at 360 dpi, which is equal to the resolution of the color printer 212 (step S336). The printing data is transferred to the color printer 212 and is printed (step S337).

If "fax transmission" is selected (step S338), the JPEG image data read from the CompactFlash card is decompressed by the JPEG compressor/decompressor 251 (step S339). The CIELAB-YCbCr converter 254 converts the data to LAB color-space image data (step S340). The data is compressed by the JPEG compressor/decompressor 251 (step S341), and the compressed data is stored in the RAM 242. The process waits for a shortcut number of the destination fax 105 to be selected (step S342), and then the process originates a call to the selected phone number via the ISDN (step S343). In response to a response from the ISDN, the JPEG image data stored in the RAM 242 in the hand scanner 102 is transferred to the fax modem 214 via the common register 210 and is subjected to analog modulation (step S344). The analog signal is converted to PCM-coded data by the PCM codec 227 (step S345), and the data is transmitted to the ISDN (step S346). If the destination fax 105 has a function for decompressing JPEG data, the destination fax 105 can decompress the received file and print the data.

If "e-mail transmission" is selected (step S347), the JPEG image data read from the CompactFlash card is maintained in the RAM 242. If the amount of data is below 1 MB (step S348), the process determines that there is no problem in attaching the data to an e-mail message and sending the e-mail message. The process then proceeds to transmission processing (step S352).

In contrast, if the amount of data stored in the RAM 242 is 1 MB or greater (step S348), it is necessary to convert the resolution. The process decompresses the JPEG image data (step S349) and performs processing in order to reduce the number of pixels. For example, the process vertically and horizontally decimates the image at a rate of 1:2 pixels. As a result, the number of pixels is reduced to one fourth (step S350). In this manner, the process reduces the number of pixels and compresses the data according to the JPEG format (step S351). The compressed data is again stored in the RAM 242. Even when the amount of data is 1 MB or greater (step S348), the process again performs processing in order to reduce the resolution (step S350). When the process repeats the processing and the amount of JPEG-compressed data is reduced to below 1 MB, the image data to be transmitted is set. As described above, the amount of data can be reduced by increasing the data compression ratio.

When the image data to be transmitted is set, the process starts transmission processing. The process waits for a shortcut number that corresponds to the recipient e-mail address (step S352). In order to create data to be attached to an e-mail message, the image data stored in the RAM 242 in the hand scanner 102 is transferred to the SRAM 204 in the fax 101 via the common register 210.

In a manner similar to that described above, predetermined header information is appended to the JPEG-compressed image data stored in the SRAM 204. Thus, data in the Internet e-mail format is created (step S353).

After the e-mail format data is created, the process originates a call to the pre-registered ISP 106 (step S354). If a response message from the ISDN is received, the process establishes a connection with a communication path. When a phone line with the ISP 106 is established, the process logs in through the PAP procedures and sends the e-mail message in accordance with SMTP (step S355).

When the destination PC 107 receives the e-mail message which has been sent to the ISP 106 via the Internet, the destination PC 107 can open the e-mail message sent from the fax 101, to which the JPEG-compressed image data is attached. If the destination PC 107 has a function for decompressing JPEG data, the destination PC can read the transmitted color image.

In the first embodiment, an example has been described in which an image captured by the digital camera 103 is read from the CompactFlash card into the hand scanner 102. However, the present invention is not limited to this example. For example, similar advantages can be achieved by transferring data from the digital camera 103 in real time using a wired or wireless communication link.

According to the first embodiment, when color image data is transmitted as an e-mail message, the color image is transmitted with a lower resolution or at a higher data compression ratio compared with a case in which the image data is transmitted using a fax. As a result, the amount of data transmitted as an e-mail message is reduced, and hence the burden on a server is lessened.

According to the first embodiment, an example has been described in which the selectable processing modes include printing, fax transmission, and e-mail transmission. Also, it is possible to combine an additional processing mode with these processing modes. For example, it is possible to employ additional processing modes, namely, monochrome/color scanning modes for the hand scanner 102. The first embodiment can be applied only when the color scanning mode is selected. In other words, when the monochrome scanning mode is selected, it is possible to transmit a high-resolution image, which is similar to that in fax transmission, even when the image is sent as an e-mail message.

Second Embodiment

A second embodiment of the present invention will now be described.

In the first embodiment, an example has been described in which the processing mode, such as printing, fax transmission, or e-mail transmission, is selected after a document is scanned by the hand scanner 102. In the second embodiment, the processing mode is selected prior to scanning a document, thus enabling the hand scanner 102 to scan the document with the optimal resolution, resulting in an increase in the scanning speed.

Since the device configuration of the second embodiment is similar to that of the first embodiment, repeated descriptions are omitted.

Figure 5B:
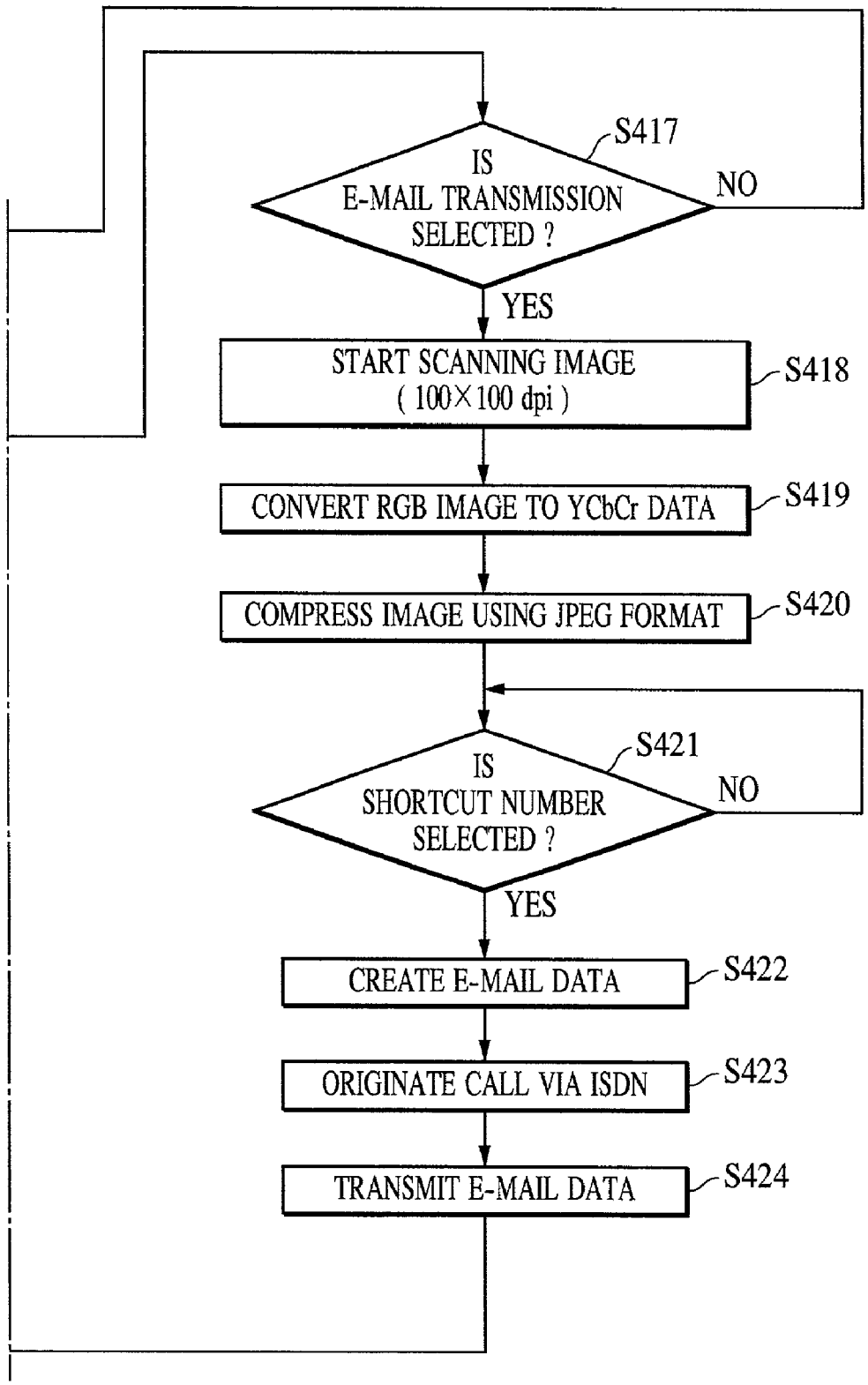

FIG. 5, which consists of FIGS. 5A and 5B, is a flowchart showing a process for transmitting image data scanned by the hand scanner 102 connected to the fax 101 of the second embodiment.

At the beginning of scanning by the hand scanner 102, the start key is pressed (step S401). In response to this, the display unit of the hand scanner 102 displays a menu so that the user can select printing, fax transmission, or e-mail transmission (step S402).

When "printing" is selected (step S403), the process starts scanning an image with a resolution of 200×200 dpi (step S404). The scanned RGB image data is converted to digital data, is subjected to shading correction, and is converted to CMYK data by the RGB→CMYK color-space converter 249 (step S405). After the CMYK data is subjected to γ conversion, the data is stored in the RAM 242 in the hand scanner 102.

The image data stored in the RAM 242 is transferred to the printer image processor 211 in the fax 101 via the common register 210. The printer image processor 211 converts the image data to printing data at 360 dpi, which is equal to the resolution of the color printer 212 (step S406). The data is transferred to the color printer 212 and is printed (step S407).

When "fax transmission" is selected (step S408), the process starts scanning the image with a resolution of 200×200 dpi (step S409). The scanned RGB image data is converted to digital data, is subjected to shading correction, and is converted to LAB data by the RGB→CIELAB color-space converter 247 (step S410). The LAB data is subjected to γ conversion and JPEG compression (step S411), and the data is stored in the RAM 242.

The process waits for a shortcut number of the destination fax 105 to be selected (step S412) and originates a call to the selected phone number via the ISDN (step S413). In response to a response from the ISDN, the JPEG image data stored in the RAM 242 in the hand scanner 102 is transferred to the fax modem 214 via the common 10l register 210 and is subjected to analog modulation (step S414). The analog signal is converted to PCM-coded data by the PCM codec 227 (step S415) and is transmitted to the ISDN (step S416). If the destination fax 105 has a function for decompressing JPEG data, the destination fax 105 can decompress the received file and print the data.

If "e-mail transmission" is selected (step S417), the process starts scanning the image with a resolution of 100×100 dpi (step S418). The scanned image data is converted to digital data, is subjected to shading correction, and is converted to YCbCr data by the RGB→YCbCr color-space converter 248 (step S419). The YCbCr data is subjected to γ conversion and JPEG compression (step S420), and the data is stored in the RAM 242.

The process waits for a shortcut number that corresponds to the recipient e-mail address (step S421). In order to create data to be attached to an e-mail message, the image data stored in the RAM 242 in the hand scanner 102 is transferred to the SRAM 204 in the fax 101 via the common register 210. By appending predetermined header information, which is similar to that in the first embodiment, to the JPEG-compressed image data in the SRAM 204, data in the Internet e-mail format is created (step S422).

When the e-mail format data is created, the process originates a call to the pre-registered ISP 106 (step S423). When a response message from the ISDN is received, the process establishes a connection with a communication path.

When a phone line with the ISP 106 is established, the process logs in through the PAP procedures and sends the e-mail message in accordance with SMTP (step S424).

As described above, according to the second embodiment, the image scanning resolution employed by the hand scanner 102 is changed beforehand in accordance with the selected processing mode. Thus, the scanning speed, particularly in the case of e-mail transmission, is improved.

In the second embodiment, it is possible to employ additional processing modes, namely, monochrome/color scanning modes for the hand scanner 102. The second embodiment can be applied only when the color scanning mode is selected. In other words, when the monochrome scanning mode is selected, it is possible to transmit a high-resolution image, which is similar to that used in fax transmission, even when the image is sent with an e-mail message.

If "e-mail transmission" is selected, and if the amount of image data still exceeds 1 MB even when the scanning resolution is reduced, it is possible to again change the resolution of the image or to change values in the equalization table, as in the first embodiment.

When "e-mail transmission" is selected, it is possible to configure that the process scans an image with a resolution of 200×200 dpi, which is the same as in fax transmission, and that the process sets values in the quantization table, which is used to compress data according to the JPEG format, so that the data compression ratio becomes higher than that in fax transmission.

Third Embodiment

A third embodiment of the present invention will now be described.

In the first and second embodiments, examples have been described in which image data obtained by scanning a page of a document by the hand scanner 102 is transmitted. In fact, however, there are cases in which the hand scanner 102 scans a plurality of pages of a document, and the total amount of pieces of image data may exceed 1 MB. In the third embodiment, for example, when the total amount of pieces of image data exceeds 1 MB, the image data are sent page by page as a separate e-mail message.

Since the device configuration of the third embodiment is similar to that of the first embodiment, repeated descriptions are omitted. Since a process for transmitting image data in the third embodiment is applicable to both the first and second embodiments, the process is described with reference to the flowchart of the second embodiment, which is shown in FIG. 5.

According to the third embodiment, when "e-mail transmission" is selected (step S417), the hand scanner 102 starts scanning images with a resolution of 100×100 dpi (step S418). In a manner similar to that described in the second embodiment (steps S419 and S420), the process compresses the scanned image data page by page according to the JPEG format and stores the compressed data in the RAM 242. Specifically, the data is stored page by page in the RAM 242.

In a manner similar to that described in the second embodiment (steps S421 and 422), the process creates data to be attached to e-mail messages. At this moment, the process limits the total amount of image data to be attached to each e-mail message to below 1 MB.

For example, the process scans five pages of a document, each page having 400-KB data. In this case, the process creates a first piece of e-mail format data to which the first and second pages are attached, a second piece of e-mail format data to which the third and fourth pages are attached, and a third piece of e-mail format data to which the fifth page is attached.

When the e-mail format data are created, the process originates a call to the pre-registered ISP 106 (step S423). When a phone line with the ISP 106 is established, the process logs in through the PAS procedures and transmits the first to third e-mail messages one after another in accordance with SMTP (step S424).

As described above, according to the third embodiment, when transmitting color image data of a plurality of pages by attaching the data to e-mail messages, the data is divided into a plurality of portions, each portion being attached to an e-mail message. Thus, the burden on a server is lessened.

According to the third embodiment, an example has been described in which color images of a plurality of pages are transmitted by attaching them to e-mail messages. However, the present invention is not limited to this example. The present invention can be applied to cases in which monochrome images of a plurality of pages are transmitted by attaching them to e-mail messages. In other words, in order to transmit a group of monochrome images of a plurality of pages using e-mail messages, the monochrome images can be divided into a plurality of portions, each portion being attached to an e-mail message, so that the amount of data attached to each e-mail message does not exceed 1 MB. As described above, when e-mail transmission is selected, values in the quantization table used to convert data according to the JPEG format can be changed.

Fourth Embodiment

A fourth embodiment of the present invention will now be described.

Since the device configuration of the fourth embodiment is similar to that of the first embodiment, repeated descriptions are omitted.

In the first to third embodiments, the resolution of image data is converted to reduce the amount of data to smaller than a predetermined amount, thus preventing the occurrence of a problem.

According to the fourth embodiment, when the amount of data exceeds a predetermined amount, the message "The image size is too large" or the like is displayed, and the transmission is stopped. Thus, the occurrence of a problem can be prevented as in the first to third embodiments.

Fifth Embodiment

According to the foregoing embodiments, e-mail transmission is performed by assembling data in the fax 101 into the e-mail format. Alternatively, when the public network side or the ISP 106 side has a function for receiving facsimile format image data and converting the data to the e-mail format, image data can be sent using an e-mail message without the fax 101 converting the facsimile format image data into the e-mail format data.

In this case, the fax 101 is required to keep the amount of image data to smaller than 1 MB while handling the image data as facsimile format data.

A process for transmitting image data to a network capable of performing the foregoing function is described.

Figure 6B:
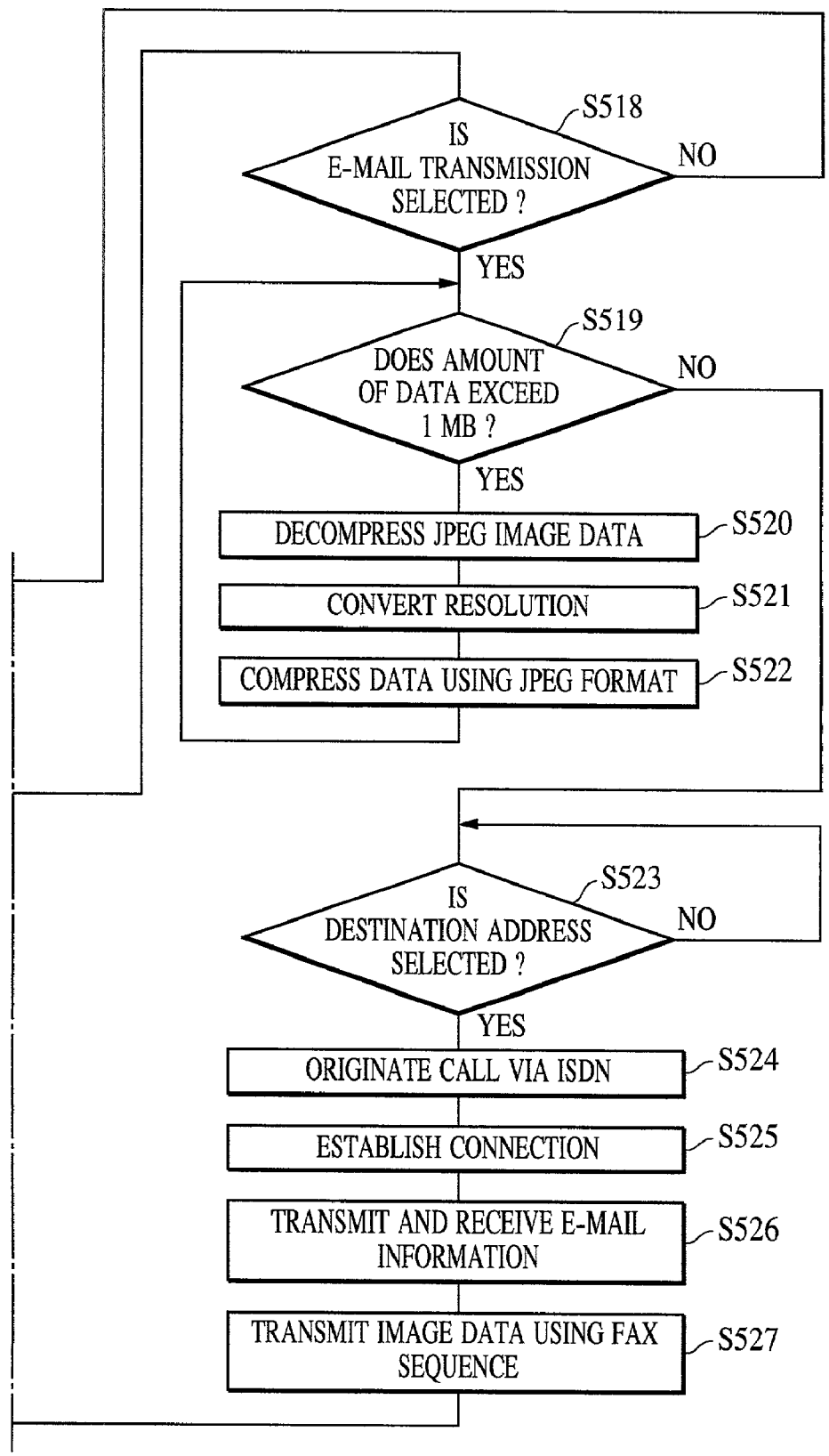

Referring to FIG. 6 which consists of FIGS. 6A and 6B, a case is described in which image data scanned by the hand scanner 102 is transmitted. When printing or transmitting by facsimile image data scanned by the hand scanner 102, the process follows the same procedures (steps S501 to S517) as those in the first embodiment.

When "e-mail transmission" is selected (step S518), unlike the first embodiment, color space conversion is performed at the ISP 106 side. Thus, the process can proceed using LAB color-space data. The process measures the amount of JPEG image data stored in the RAM 242. If the amount of data does not exceed 1 MB (step S519), the process determines that there is no problem in attaching the data to an e-mail message and sending the e-mail message. The process directly proceeds to transmission processing. In the transmission processing, the process selects a destination e-mail address (step S523). When the e-mail address is selected, the process originates a call to a specific phone number which offers an e-mail conversion service (step S524).

When a connection with an e-mail conversion server at the above phone number is established, the process establishes a connection with the server using a dual tone multifrequency (DTMF) signal (step S525). The process transmits and receives e-mail information using a V.23 modem (step S526). In this processing step, the process transmits information such as the selected recipient e-mail address information and the subject title to the server.

When transmission of the information is completed, the process starts transmitting image data to be attached to an e-mail message. The image data is transmitted by a T.30 facsimile sequence (step S527).

When the ISP 106 side receives the fax image data, the ISP 106 performs color-space conversion of the data in order to use the data as an e-mail image. The ISP 106 converts the data into the e-mail format and transfers the data to an e-mail server.

In contrast, when the amount of data stored in the RAM 242 is 1 MB or greater (step S519), it is necessary to convert the resolution. The process decompresses the JPEG image data (step S520) and converts the 200×200 dpi data to 100×100 dpi data by decimation (step S521). Subsequently, the process again compresses the data according to the JPEG format (step S522). As a result, the amount of data is reduced to approximately one fourth. It is thus possible to conclude that the amount of data is reduced to smaller than 1 MB. If, however, the amount of JPEG-compressed data is still 1 MB or greater (step S519), the process performs processing to further reduce the resolution (step S521). The process then repeats. When the amount of JPEG-compressed data becomes smaller than 1 MB, the image data to be transmitted is set.

When the image data to be transmitted is set, the process establishes a connection with the server through the above-described procedures and transmits the image data (steps S523 to S527).

Figure 7A:
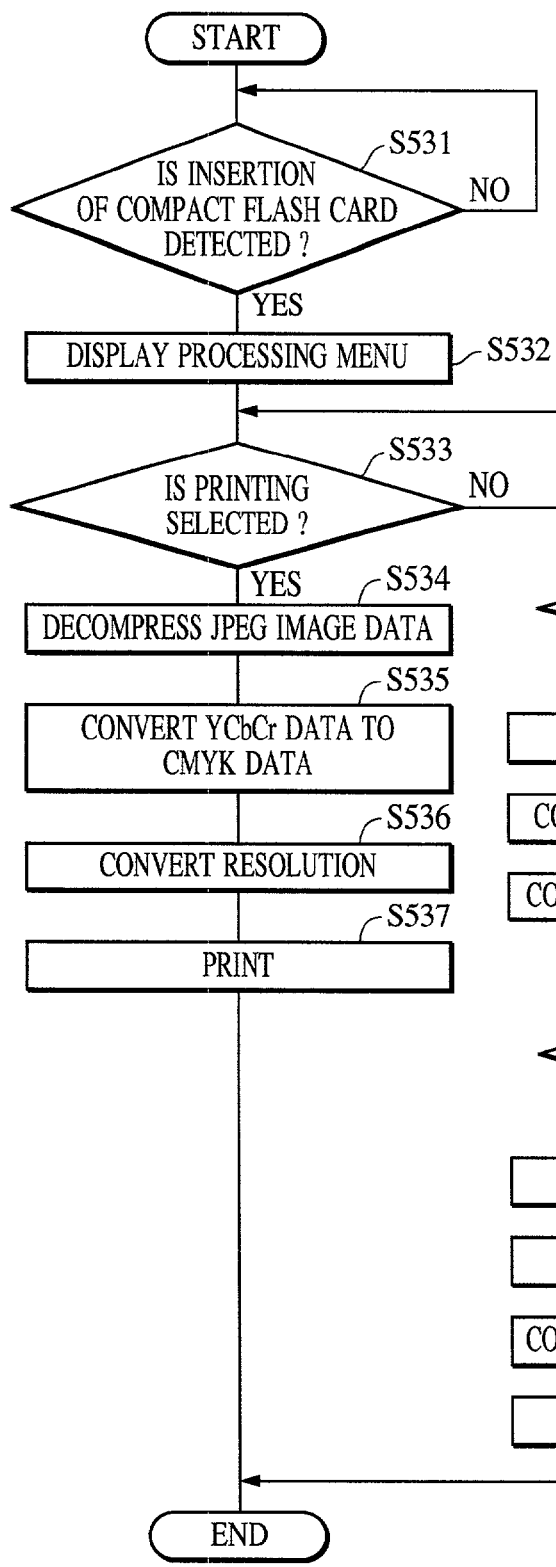
FIGS. 7A and 7B when taken together as shown in FIG. 7 form a flowchart showing a process performed by the fax of the fifth embodiment.
Figure 7B:
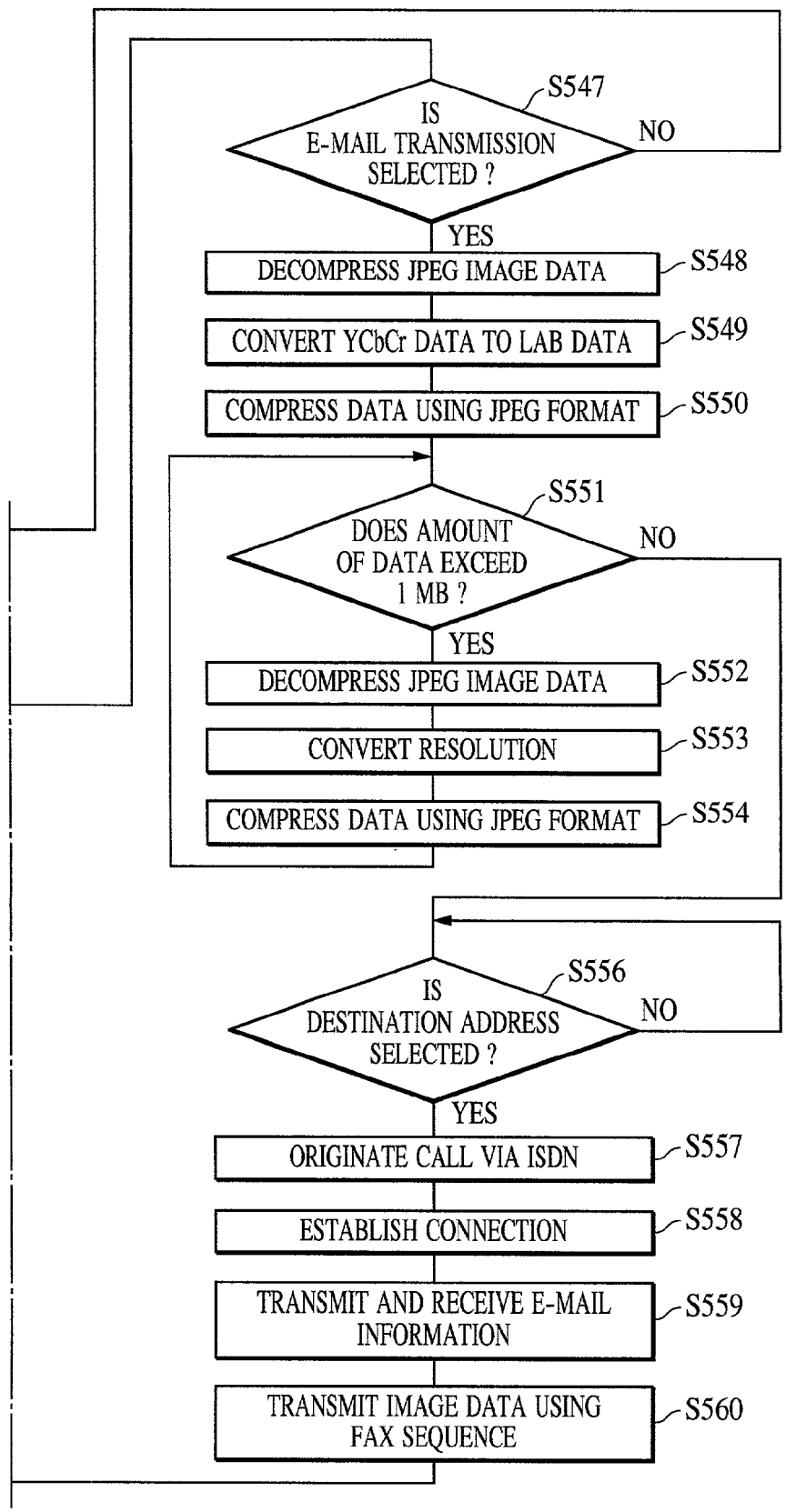

Referring to FIG. 7 which consists of FIGS. 7A and 7B, a process for transmitting image data obtained by another image input device (the digital camera 103 in the fifth embodiment) is described.

When printing or transmitting by facsimile data stored in a CompactFlash card, the process follows the same procedures as steps S331 to S346.

When "e-mail transmission" is selected (step S547), JPEG image data read from the CompactFlash card is decompressed by the JPEG compressor/decompressor 251 (step S548), and the decompressed data is converted to LAB color-space image data by the CIELAB-YCbCr converter 254 (step S549). The data is again compressed by the JPEG compressor/decompressor 251 (step S550) and is stored in the RAM 242.

At this time, the process measures the amount of image data. If the amount of data is smaller than 1 MB (step S551), the process determines that there is no problem in attaching the image data to an e-mail message and sending the e-mail message. The process directly proceeds to transmission processing (step S552). The transmission processing is similar to the above-described process for transmitting image data scanned by the hand scanner 102.

In contrast, if the amount of data stored in the RAM 242 is 1 MB or greater (step S551), it is necessary to convert the resolution. The process decompresses the JPEG image data (step S552) and performs processing in order to reduce the number of pixels. For example, the process vertically and horizontally decimates the image at a rate of 1:2 pixels. As a result, the number of pixels is reduced to one fourth (step S553). In this manner, the process reduces the number of pixels and compresses the data according to the JPEG format (step S554). The compressed data is again stored in the RAM 242. When the amount of data is 1 MB or greater (step S551), the process again performs processing in order to reduce the resolution (step S553). The process then repeats. When the amount of JPEG-compressed data becomes smaller than 1 MB, the image data to be transmitted is set. When the image data to be transmitted is set, the process performs transmission processing similar to the above-described process for transmitting image data in the hand scanner 102 (step S556 to 560).

The transmitted data is received by the fax/e-mail conversion server. The data is subjected to JPEG decompression and LAB→YCbCr color-space conversion. The color-space converted data is compressed according to the JPEG format and is assembled into e-mail format data. The e-mail format data is transmitted to the e-mail address designated by the fax 101.

When an image to be transmitted is monochrome, the fax 101 compresses facsimile format image data using Modified Huffman encoding (MH) and transmits the compressed data to the server. When the amount of compressed data exceeds 1 MB, the process reduces the number of pages and performs transmission.

For example, when the amount of data exceeds 1 MB at page 21, the message "The number of pages is too large. Only 20 pages will be transmitted" is displayed, and only the data up to page 20 is transmitted. The server receives the data, generates a TIFF-F format file based on the received image data, and transmits the file to the e-mail address designated by the fax 101.

As described above, the amount of image data can be reduced by changing values in the quantization table.

Sixth Embodiment

In the fifth embodiment described above, a case has been described in which the process determines whether or not to transmit data of a plurality of pages based on the amount of data. If the average amount of data per page is known in advance, it is possible to impose a limitation based on the number of pages. In this way, a user can recognize in advance the number of pages that can be transmitted. This also eliminates the possibility of read data being wasted by not being transmitted.

Specifically, the size of JPEG-compressed data of a color facsimile standard document is approximately 300 KB. Thus, it can be concluded that the number of pages that can be attached to an e-mail message is approximately three pages. If the number of pages exceeds three pages at the time the document is read, facsimile transmission can be cancelled, thus achieving similar advantages.

Also, similar advantages can be achieved by performing a process for transmitting a document having three pages or less.

Seventh Embodiment

In the first embodiment, a case has been described in which e-mail format data is created in a fax (a direct connection with an ISP is established). According to the sixth embodiment, a case has been described in which a connection is established with a server for converting a facsimile-format image to e-mail-format data (fax/e-mail conversion service is used). Alternatively, the fax 101 can select one from among the two methods when transmitting an e-mail message.

When "e-mail transmission" is selected in step S318 in FIG. 3, the name of the connected recipient is displayed. When the ISP is selected, an e-mail message is sent using the method described in the first embodiment. When the fax/e-mail conversion service is selected, facsimile format data is transmitted using the method described in the sixth embodiment.

Modifications

Modifications to the first to sixth embodiments will now be described.

According to the foregoing embodiments, cases have been described in which a user selects the processing mode of the fax 101 from among printing, fax transmission, and e-mail transmission displayed on the processing menu.

Alternatively, the transmission mode can be detected without displaying such processing modes on the menu. In this case, the transmission mode can be detected by determining whether the destination shortcut number selected by a user corresponds to a facsimile number or an e-mail address.

For example, when a shortcut number registered in a telephone directory in the fax 101 indicates a facsimile number, "F" is displayed next to a name. Similarly, when a shortcut number indicates an e-mail address, "E" is displayed next to a name. Thus, the user can distinguish a facsimile number from an e-mail address.

Alternatively, dedicated keys such as a fax key and an e-mail key can be provided on the operation panel 213. For example, when the fax key is pressed, only facsimile numbers registered in the telephone directory are displayed, thereby achieving similar advantages.

According to the foregoing embodiments, examples have been described in which the ISDN is used as a public communication network. When performing fax transmission, data modulated by the fax modem 214 is PCM-encoded. When performing e-mail transmission, data assembled into an HDLC frame is directly transmitted to the ISDN.

When a public communication network is an analog network (public switched telephone network (PSTN)), the present invention can achieve similar advantages. In this case, when performing fax transmission, analog signals modulated by the fax modem 214 are directly transmitted to the PSTN. When performing e-mail transmission, e-mail format data is modulated into analog data by the fax modem 214, and the analog data can be transmitted to the PSTN.

Also, the present invention is applicable to cases in which e-mail messages are transmitted from the fax 101 using cable television communication lines, asymmetric digital subscriber line (ADSL), fiber optic cables, and the like.

According to the foregoing embodiments, examples have been described in which the hand scanner 102 is removed from the fax 101 and performs scanning. However, the present invention is similarly applicable to a case in which the hand scanner 102 is fixed on the fax 101 or to a case in which the hand scanner 102 is removable from the fax 101.

Also, the amount of attached data that can be transmitted is not limited to 1 MB. As long as a high-speed communication network can be achieved, the amount of data in conformity with the communication network can be set as a threshold value.

The present invention can be applied to a system consisting of a plurality of devices such as a host computer, an interface device, a reader, a printer, and the like, and to an apparatus consisting of a single device such as a copy machine, a facsimile apparatus, and the like.

The objects of the present invention can be achieved by supplying a storage medium or a recording medium which has recorded thereon software program code for implementing the functions of the foregoing embodiments to a system or an apparatus, so that a computer (CPU or MPU) of the system or the apparatus can read and execute the program code stored in the storage medium. In such cases, the program code read from the storage medium implements the functions of the foregoing embodiments, and the storage medium storing the program code forms the present invention. Not only the functions of the embodiments are achieved by the computer by reading and executing the program code, the functions of the embodiments can be achieved by an operating system (OS) which runs on the computer by performing part or entirety of the actual processing based on instructions from the program code.

Furthermore, the functions of the foregoing embodiments can be achieved by writing the program code read from the storage medium to an add-on card inserted into the computer or to a memory of an add-on unit connected to the computer. A CPU of the add-on card or the add-on unit can perform part or entirety of the actual processing based on instructions from the program code.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image communicating apparatus for transmitting image data to another apparatus through a public communication network, comprising:

input means for inputting image data;

compression means for compressing the image data input by said input means;

first transmission means for transmitting by facsimile the image data compressed by said compression means;

second transmission means for transmitting the image data compressed by said compression means as attached data in an e-mail message;

selection means for selecting said first transmission means or said second transmission means;

determination means for determining, when said second transmission means is selected by said selection means, whether or not the amount of image data compressed by said compression means is a predetermined amount or greater; and reduction means for reducing the amount of image data to less than the predetermined amount when said determination means determines that the amount of image data is the predetermined amount or greater, wherein said reduction means decompresses the compressed image data and causes said compression means to again compress the image data with a lower resolution.

2. An image communicating apparatus for transmitting image data to another apparatus through a public communication network, comprising:
input means for inputting image data;
compression means for compressing the image data input by said input means;
first transmission means for transmitting by facsimile the image data compressed by said compression means;
second transmission means for transmitting the image data compressed by said compression means as attached data in an e-mail message;
selection means for selecting said first transmission means or said second transmission means;
determination means for determining, when said second transmission means is selected by said selection means, whether or not the amount of image data compressed by said compression means is a predetermined amount or greater; and
reduction means for reducing the amount of image data to less than the predetermined amount when said determination means determines that the amount of image data is the predetermined amount or greater,
wherein said reduction means decompresses the compressed image data and causes said compression means to again compress the image data at a higher compression ratio.

3. An image communicating apparatus according to claim 2, wherein said compression means perform JPEG compression; and
said reduction means changes values in a quantization table used to perform JPEG compression.

4. An image communicating apparatus for transmitting image data to another apparatus through a public communication network, comprising:
input means for inputting image data, wherein said input means includes a scanner for scanning a document image;
a converting means for converting the color space of an image scanned by said scanner to YCbCr;
compression means for compressing the image data input by said input means;
first transmission means for transmitting by facsimile the image data compressed by said compression means;
second transmission means for transmitting the image data compressed by said compression means as attached data in an e-mail message;
selection means for selecting said first transmission means or said second transmission means;
determination means for determining, when said second transmission means is selected by said selection means, whether or not the amount of image data compressed by said compression means is a predetermined amount or greater; and
reduction means for reducing the amount of image data to less than the predetermined amount when said determination means determines that the amount of image data is the predetermined amount or greater.

5. An image communicating apparatus for transmitting image data to another apparatus through a public communication network, comprising:
input means for inputting image data;
compression means for compressing the image data input by said input means;
first transmission means for transmitting by facsimile the image data compressed by said compression means;
second transmission means for transmitting the image data compressed by said compression means as attached data in an e-mail message;
selection means for selecting said first transmission means or said second transmission means;
determination means for determining, when said second transmission means is selected by said selection means, whether or not the amount of image data compressed by said compression means is a predetermined amount or greater;
reduction means for reducing the amount of image data to less than the predetermined amount when said determination means determines that the amount of image data is the predetermined amount or greater; and
display means for displaying that it is determined, by said determination means, that the amount of data is the predetermined amount or greater.

6. An image communicating apparatus for transmitting image data to another apparatus through a public communication network, comprising:
scanning means for scanning a document image;
compression means for compressing image data scanned by said scanning means;
first transmission means for transmitting by facsimile the image data compressed by said compression means;
second transmission means for transmitting the image data compressed by said compression means as attached data in an e-mail message;
selection means for selecting said first transmission means or said second transmission means;
setting means for setting a scanning resolution employed by said scanning means, when said second transmission means is selected by said selection means, to be lower than a scanning resolution employed by said scanning means when said first transmission means is selected;
determination means for determining, when said second transmission means is selected by said selection means, whether or not the amount of image data compressed by said compression means is a predetermined amount or greater; and
reduction means for reducing the amount of image data to less than the predetermined amount when said determination means determines that the amount of image data is the predetermined amount or greater,
wherein said reduction means decompresses the compressed image data and causes said compression means to again compress the image data with a lower resolution.

7. An image communicating apparatus for transmitting image data to another apparatus through a public communication network, comprising:
scanning means for scanning a document image;
compression means for compressing image data scanned by said scanning means;
first transmission means for transmitting by facsimile the image data compressed by said compression means;
second transmission means for transmitting the image data compressed by said compression means as attached data in an e-mail message;
selection means for selecting said first transmission means or said second transmission means;
setting means for setting a scanning resolution employed by said scanning means, when said second transmission means is selected by said selection means, to be lower than a scanning resolution employed by said scanning means when said first transmission means is selected;

determination means for determining, when said second transmission means is selected by said selection means, whether or not the amount of image data compressed by said compression means is a predetermined amount or greater; and reduction means for reducing the amount of image data to less than the predetermined amount when said determination means determines that the amount of image data is the predetermined amount or greater, wherein said reduction means decompresses the compressed image data and causes said compression means to again compress the image data at a higher compression ratio.

8. An image communicating apparatus according to claim 7, wherein said compression means performs JPEG compression; and said reduction means changes values in a quantization table used to perform JPEG compression.

9. An image communicating method for transmitting image data to another apparatus through a public communication network, comprising:

an input step, of inputting image data;

a compression step, of compressing the image data input in said input step;

a first transmission step, of transmitting by facsimile the image data compressed in said compression step;

a second transmission step, of transmitting the image data compressed in said compression step as attached data in an e-mail message;

a selection step, of selecting said first transmission step or said second transmission step;

a determination step, of determining, when said second transmission step is selected in said selection step, whether or not the amount of image data compressed in said compression step is a predetermined amount or greater; and a reduction step, of reducing the amount of image data to less than the predetermined amount when said determination step determines that the amount of image data is the predetermined amount or greater, wherein said reduction step includes decompressing the compressed image data and causing said compression step to again compress the image data with a lower resolution.

10. An image communicating method for transmitting image data to another apparatus through a public communication network, comprising:

an input step, of inputting image data;

a compression step, of compressing the image data input in said input step;

a first transmission step, of transmitting by facsimile the image data compressed in said compression step;

a second transmission step, of transmitting the image data compressed in said compression step as attached data in an e-mail message;

a selection step, of selecting said first transmission step or said second transmission step;

a determination step, of determining, when said second transmission step is selected in said selection step, whether or not the amount of image data compressed in said compression step is a predetermined amount or greater; and a reduction step, of reducing the amount of image data to less than the predetermined amount when said determination step determines that the amount of image data is the predetermined amount or greater, wherein said reduction step includes decompressing the compressed image data and causing said compression step to again compress the image data at a higher compression ratio.

11. An image communicating method according to claim 10, wherein said compression step includes performing JPEG compression, and said reduction step includes changing values in a quantization table used to perform JPEG compression.

12. An image communicating method for transmitting image data to another apparatus through a public communication network, comprising:

an input step, of inputting image data, wherein said input step includes a scanning step, of scanning a document image;

a converting step, of converting the color space of an image scanned in said scanning step to YCbCr;

a compression step, of compressing the image data input in said input step;

a first transmission step, of transmitting by facsimile the image data compressed in said compression step;

a second transmission step, of transmitting the image data compressed in said compression step as attached data in an e-mail message;

a selection step, of selecting said first transmission step or said second transmission step;

a determination step, of determining, when said second transmission step is selected in said selection step, whether or not the amount of image data compressed in said compression step is a predetermined amount or greater; and a reduction step, of reducing the amount of image data to less than the predetermined amount when said determination step determines that the amount of image data is the predetermined amount or greater.

13. An image communicating method for transmitting image data to another apparatus through a public communication network, comprising:

an input step, of inputting image data;

a compression step, of compressing the image data input in said input step;

a first transmission step, of transmitting by facsimile the image data compressed in said compression step;

a second transmission step, of transmitting the image data compressed in said compression step as attached data in an e-mail message;

a selection step, of selecting said first transmission step or said second transmission step;

a determination step, of determining, when said second transmission step is selected in said selection step, whether or not the amount of image data compressed in said compression step is a predetermined amount or greater;

a reduction step, of reducing the amount of image data to less than the predetermined amount when said determination step determines that the amount of image data is the predetermined amount or greater; and a display step, of displaying that it is determined, in said determination step, that the amount of data is the predetermined amount or greater.

14. An image communicating method for transmitting image data to another apparatus through a public communication network, comprising:

a scanning step, of scanning a document image;

a compression step, of compressing image data scanned in said scanning step;

a first transmission step, of transmitting by facsimile the image data compressed in said compression step;

a second transmission step, of transmitting the image data compressed in said compression step as attached data in an e-mail message;

a selection step, of selecting said first transmission step or said second transmission step;

a setting step, of setting a scanning resolution employed in said scanning step, when said second transmission step is selected in said selection step, to be lower than a scanning resolution employed in said scanning step when said first transmission step is selected;

a determination step, of determining, when said second transmission step is selected in said selection step, whether or not the amount of image data compressed in said compression step is a predetermined amount or greater; and a reduction step, of reducing the amount of image data to less than the predetermined amount when said determination step determines that the amount of image data is the predetermined amount or greater, wherein said reduction step includes decompressing the compressed image data and causing said compression step to again compress the image data with a lower resolution.

15. An image communicating method for transmitting image data to another apparatus through a public communication network, comprising:

a scanning step, of scanning a document image;

a compression step, of compressing image data scanned in said scanning step;

a first transmission step, of transmitting by facsimile the image data compressed in said compression step;

a second transmission step, of transmitting the image data compressed in said compression step as attached data in an e-mail message;

a selection step, of selecting said first transmission step or said second transmission step;

a setting step, of setting a scanning resolution employed in said scanning step, when said second transmission step is selected in said selection step, to be lower than a scanning resolution employed in said scanning step when said first transmission step is selected;

a determination step, of determining, when said second transmission step is selected in said selection step, whether or not the amount of image data compressed in said compression step is a predetermined amount or greater; and a reduction step, of reducing the amount of image data to less than the predetermined amount when said determination step determines that the amount of image data is the predetermined amount or greater, wherein said reduction step includes decompressing the compressed image data and causing said compression means to again compress the image data at a higher compression ratio.

16. An image communicating method according to claim 15, wherein said compression step includes performing JPEG compression; and said reduction step includes changing values in a quantization table used to perform JPEG compression.

17. A computer-readable storage medium storing a program for causing an image communication apparatus for transmitting image data to another apparatus through a public communication network to execute the following steps, said program comprising:

an input step, of inputting image data;

a compression step, of compressing the image data input in said input step;

a first transmission step, of transmitting by facsimile the image data compressed in said compression step;

a second transmission step, of transmitting the image data compressed in said compression step as attached data in an e-mail message;

a selection step, of selecting said first transmission step or said second transmission step;

a determination step, of determining, when said second transmission step is selected in said selection step, whether or not the amount of image data compressed in said compression step is a predetermined amount or greater; and a reduction step, of reducing the amount of image data to less than the predetermined amount when said determination step determines that the amount of image data is the predetermined amount or greater, wherein said reduction step includes decompressing the compressed image data and causing said compression step to again compress the image data with a lower resolution.

18. A computer-readable storage medium storing a program for causing an image communication apparatus for transmitting image data to another apparatus through a public communication network to execute the following steps, said program comprising:

an input step, of inputting image data;

a compression step, of compressing the image data input in said input step;

a first transmission step, of transmitting by facsimile the image data compressed in said compression step;

a second transmission step, of transmitting the image data compressed in said compression step as attached data in an e-mail message;

a selection step, of selecting said first transmission step or said second transmission step;

a determination step, of determining, when said second transmission step is selected in said selection step, whether or not the amount of image data compressed in said compression step is a predetermined amount or greater; and a reduction step, of reducing the amount of image data to less than the predetermined amount when said determination step determines that the amount of image data is the predetermined amount or greater, wherein said reduction step includes decompressing the compressed image data and causing said compression step to again compress the image data at a higher compression ratio.

19. The computer-readable storage medium according to claim 18, wherein said compression step includes performing JPEG compression, and said reduction step includes changing values in a quantization table used to perform JPEG compression.

20. A computer-readable storage medium storing a program for causing an image communication apparatus for transmitting image data to another apparatus through a public communication network to execute the following steps, said program comprising:

an input step, of inputting image data, wherein said input step includes a scanning step, of scanning a document image;

a converting step, of converting the color space of an image scanned in said scanning step to YCbCr;
a compression step, of compressing the image data input in said input step;
a first transmission step, of transmitting by facsimile the image data compressed in said compression step;
a second transmission step, of transmitting the image data compressed in said compression step as attached data in an e-mail message;
a selection step, of selecting said first transmission step or said second transmission step;
a determination step, of determining, when said second transmission step is selected in said selection step, whether or not the amount of image data compressed in said compression step is a predetermined amount or greater; and
a reduction step, of reducing the amount of image data to less than the predetermined amount when said determination step determines that the amount of image data is the predetermined amount or greater.

21. A computer-readable storage medium storing a program for causing an image communication apparatus for transmitting image data to another apparatus through a public communication network to execute the following steps, said program comprising:
an input step, of inputting image data;
a compression step, of compressing the image data input in said input step;
a first transmission step, of transmitting by facsimile the image data compressed in said compression step;
a second transmission step, of transmitting the image data compressed in said compression step as attached data in an e-mail message;
a selection step, of selecting said first transmission step or said second transmission step;
a determination step, of determining, when said second transmission step is selected in said selection step, whether or not the amount of image data compressed in said compression step is a predetermined amount or greater;
a reduction step, of reducing the amount of image data to less than the predetermined amount when said determination step determines that the amount of image data is the predetermined amount or greater; and
a display step, of displaying that it is determined, in said determination step, that the amount of data is the predetermined amount or greater.

22. A computer-readable storage medium storing a program for causing an image communication apparatus for transmitting image data to another apparatus through a public communication network to execute the following steps, said program comprising:
a scanning step, of scanning a document image;
a compression step, of compressing image data scanned in said scanning step;
a first transmission step, of transmitting by facsimile the image data compressed in said compression step;
a second transmission step, of transmitting the image data compressed in said compression step as attached data in an e-mail message;
a selection step, of selecting said first transmission step or said second transmission step;
a setting step, of setting a scanning resolution employed in said scanning step, when said second transmission step is selected in said selection step, to be lower than a scanning resolution employed in said scanning step when said first transmission step is selected;
a determination step, of determining, when said second transmission step is selected in said selection step, whether or not the amount of image data compressed in said compression step is a predetermined amount or greater; and
a reduction step, of reducing the amount of image data to less than the predetermined amount when said determination step determines that the amount of image data is the predetermined amount or greater,
wherein said reduction step includes decompressing the compressed image data and causing said compression step to again compress the image data with a lower resolution.

23. A computer-readable storage medium storing a program for causing an image communication apparatus for transmitting image data to another apparatus through a public communication network to execute the following steps, said program comprising:
a scanning step, of scanning a document image;
a compression step, of compressing image data scanned in said scanning step;
a first transmission step, of transmitting by facsimile the image data compressed in said compression step;
a second transmission step, of transmitting the image data compressed in said compression step as attached data in an e-mail message;
a selection step, of selecting said first transmission step or said second transmission step;
a setting step, of setting a scanning resolution employed in said scanning step, when said second transmission step is selected in said selection step, to be lower than a scanning resolution employed in said scanning step when said first transmission step is selected;
a determination step, of determining, when said second transmission step is selected in said selection step, whether or not the amount of image data compressed in said compression step is a predetermined amount or greater; and
a reduction step, of reducing the amount of image data to less than the predetermined amount when said determination step determines that the amount of image data is the predetermined amount or greater,
wherein said reduction step includes decompressing the compressed image data and causing said compression means to again compress the image data at a higher compression ratio.

24. The computer-readable storage medium according to claim 23, wherein said compression step includes performing JPEG compression; and
said reduction step includes changing values in a quantization table used to perform JPEG compression.

* * * * *

UNITED STATES PATENT AND TRADEMARK OFFICE
CERTIFICATE OF CORRECTION

PATENT NO. : 6,972,874 B2 Page 1 of 1
APPLICATION NO. : 09/891583
DATED : December 6, 2005
INVENTOR(S) : Michihiro Izumi et al.

It is certified that error appears in the above-identified patent and that said Letters Patent is hereby corrected as shown below:

ON TITLE PAGE AT (56) FOREIGN PATENT DOCUMENTS

"9325924" should read --9-325924--;
"10322501" should read --10-322501--; and
"11068825" should read --11-068825--.

COLUMN 1

Line 7, "A" should be deleted.

Signed and Sealed this

Sixth Day of January, 2009

JON W. DUDAS
*Director of the United States Patent and Trademark Office*